United States Patent
Motik et al.

(10) Patent No.: US 11,068,657 B2
(45) Date of Patent: Jul. 20, 2021

(54) NATURAL LANGUAGE QUESTION ANSWERING SYSTEM AND METHOD BASED ON DEEP SEMANTICS

(75) Inventors: Boris Motik, Oxford (GB); Sergio Antonio Berná Niñerola, Barcelona (ES); Pablo Castellanos Garcia, Barcelona (ES); Carlos González-Cadenas, Barcelona (ES)

(73) Assignee: SKYSCANNER LIMITED, London (GB)

( * ) Notice: Subject to any disclaimer, the term of this patent is extended or adjusted under 35 U.S.C. 154(b) by 520 days.

(21) Appl. No.: 13/171,391

(22) Filed: Jun. 28, 2011

(65) Prior Publication Data

US 2011/0320187 A1    Dec. 29, 2011

Related U.S. Application Data

(60) Provisional application No. 61/359,011, filed on Jun. 28, 2010.

(51) Int. Cl.
*G06F 40/30* (2020.01)
*G06F 16/332* (2019.01)
(Continued)

(52) U.S. Cl.
CPC .......... *G06F 40/30* (2020.01); *G06F 16/3329* (2019.01); *G06F 16/3344* (2019.01); *G06F 40/295* (2020.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS

2004/0054521 A1* 3/2004 Liu ................................. 704/5
2005/0154580 A1* 7/2005 Horowitz .............. G06F 17/271
704/9
(Continued)

OTHER PUBLICATIONS

Fikes et al., OWL-QL—a language for deductive query answering on the Semantic Web, Web Semantics, 2004, Elsevier, V2N1, pp. 1-11.*

(Continued)

*Primary Examiner* — Lamont M Spooner
(74) *Attorney, Agent, or Firm* — Saul Ewing Arnstein & Lehr LLP

(57) ABSTRACT

In a computer system, systems and methods for automatically answering natural language questions using deep semantics are provided. Methods include receiving a natural language question, mapping it into one or more deductive database queries that captures one or more intents behind the question, computing one or more result sets of the question using one or more deductive database queries and a deductive database and providing one or more result sets. Systems include natural language question compilers and deductive databases. The natural language question compiler is configured to receive a natural language question and map it into one or more deductive database queries that capture one or more intents behind the question. The deductive database is configured to receive the mapped one or more deductive database queries, compute one or more result sets of the question using the one or more deductive database queries, and provide one or more result sets.

13 Claims, 5 Drawing Sheets

(51) Int. Cl.
*G06F 16/33* (2019.01)
*G06F 40/295* (2020.01)

(58) Field of Classification Search
CPC .. G06F 17/272; G06F 17/2725; G06F 17/273;
G06F 17/2735; G06F 17/274; G06F
17/2745; G06F 17/275; G06F 17/2755;
G06F 17/276; G06F 17/2765; G06F
17/277; G06F 17/2775; G06F 40/211;
G06F 40/253; G06F 40/30
USPC .................................................. 704/1, 9, 10
See application file for complete search history.

(56) References Cited

U.S. PATENT DOCUMENTS

| 2006/0122876 | A1* | 6/2006 | Von Schweber et al. ...... 705/10 |
| 2006/0253431 | A1* | 11/2006 | Bobick et al. .................... 707/3 |
| 2006/0271353 | A1* | 11/2006 | Berkan et al. .................... 704/9 |
| 2009/0070103 | A1* | 3/2009 | Beggelman et al. ............. 704/9 |
| 2009/0287678 | A1* | 11/2009 | Brown et al. ..................... 707/5 |
| 2010/0049761 | A1* | 2/2010 | Mehta ............... G06F 17/30643 707/709 |
| 2010/0070448 | A1* | 3/2010 | Omoigui ........................ 706/47 |
| 2010/0121630 | A1* | 5/2010 | Mende et al. ................... 704/7 |
| 2010/0161317 | A1* | 6/2010 | Au ................................... 704/9 |
| 2010/0228693 | A1* | 9/2010 | Dawson et al. ................ 706/12 |
| 2011/0087670 | A1* | 4/2011 | Jorstad et al. ................ 707/741 |

OTHER PUBLICATIONS

Waldinger et al., Deductive Question answering from Multiple Resources, 2004, New Directions in Question Answering, pp. 1-22.*
Perez-Urbina et al., Efficient Query Answering in OWL 2, 2009, Springer, pp. 489-504.*

* cited by examiner

NATURAL LANGUAGE QUESTION ANSWERING SYSTEM AND METHOD BASED ON DEEP SEMANTICS

CROSS-REFERENCE TO RELATED APPLICATIONS

This application claims the benefit of U.S. Provisional Application No. 61/359,011, filed Jun. 28, 2010, which is incorporated herein by reference in its entirety for all purposes.

BACKGROUND

This disclosure relates to computer-aided deep natural language question answering, and in particular to networked systems that process questions formulated in natural language and return one or more answers to the natural language question in a fully automated way, that is, without human intervention.

One of the key milestones of the Internet era has been the general availability of search engines. Before the existence of search engines, finding and accessing the information was difficult, slow and expensive. Now it is possible to find and access much of the information ever created by the mankind in less than 1 second by just typing some words into a search engine.

The world-changing value proposition brought to the table by the search engines has resulted in the creation of a huge search economy: demand and offer get connected billions of times every day through search engines. Google, the leading search engine, has become one of the most valuable companies in the world.

Users are continuously getting more sophisticated at searching. Amit Singhal, a Google Fellow and one of the key engineers in working in some of Google's core search algorithms, has famously said that search over the last few years has moved from 'Give me what I typed' to 'Give me what I want'. Users are no longer happy when the search engine retrieves documents or webpages that contain all or some of the keywords they've typed (this information retrieval approach is called document retrieval), they want to enter their questions to the search engine and get an answer as a result (this information retrieval approach is called question answering).

To illustrate the differences between the document retrieval and the question answering approaches, let's put an example. Let's imagine that an imaginary user is searching for "hotels with more than 3 stars in Barcelona that are near the beach". Search engines using the document retrieval approach will answer this question with a list of links to webpages that contain all or most of the keywords of the sentence typed by the user. In contrast, question answering systems will answer with a list of hotels that fulfill the criteria imposed by the user (3, 4 or 5 stars, located in Barcelona near the beach, . . . ).

The key advantage of the question answering systems over traditional search engines using document retrieval techniques is speed. The question answering systems give directly the answers that the users are looking for, while the search engines produce a list of documents that need to be retrieved, and the information they contain needs to be analyzed and processed in order to find the answers to the question typed. Note that the speed gap between the two kinds of systems grows with the complexity of the query (for simple questions the difference may not be noticeable, but for complex questions using search engines to solve them may be orders of magnitude slower than using a question answering system).

Pressured by the fast increase in the searchers' sophistication, both incumbents like Google and new entrants like Powerset (now part of Microsoft's Bing) have started to work on question answering. However, limited by their document retrieval technology and the "ten blue links" product orientation, they have mostly centered their efforts in what is called shallow question answering, that is, answering simple questions that can be solved by doing small improvements over their actual document retrieval technology.

For example, shallow question answering works well for simple factual questions like "what is the population of Spain" (that can be solved by rewriting the query into a simpler form like "population Spain" and then using the regular search engine to find matching documents) or "NYC-SFO flights" (that can be solved using templates for specific kinds of queries).

More complex questions like "what is the cheapest hotel located in a capital of the south of Europe?" involving complex relations with arbitrary compositionality among several entities (i.e. hotel, capital, Europe) and relationships (cheapest, located, south) cannot be solved accurately using search engines (even using shallow question answering capabilities). The reason is that the search engine won't be able to find and retrieve documents that solve the vast majority of these questions, given the exponentially large space of questions for all the potential combinations among all the possible entities and their relationships.

Solving these questions automatically will require deep question answering. Deep question answering requires deep semantics, that is, a formal representation of the entities appearing in the question and their relationships that enables the computation of the answer (note that the answers in deep question answering are computed, as opposed to shallow question answered, where they are retrieved from a previously existing collection of documents).

Therefore, what is needed, and is described in the present invention, is a system and method for automatically answering questions written in natural language using deep semantics. Given the widespread usage of search engines and the growing size and importance of the search economy, the vast improvement in the information retrieval capabilities introduced by the present invention is likely to have a lasting social and economical impact.

BRIEF SUMMARY

Embodiments of the present invention provide systems and methods for answering natural language questions that are provided as an input, using deep semantics.

According to an embodiment, a method includes receiving a natural language question as an input, mapping the natural language question provided as an input into one or more deductive database queries that capture one or more intents behind the natural language question, computing one or more result sets of the natural language question using one or more deductive database queries and a deductive database and providing one or more result sets of the natural language question. Mapping the natural language question provided as an input into a logical form can be performed by a Natural Language Question Compiler (NLQC). Computing the results to the question using the logical form can be performed by a Deductive Database (DDB).

According to another embodiment of the method, mapping the natural language question provided as an input into one or more deductive database queries that capture one or more intents behind the natural language question further includes performing a semantic parsing of the natural language question by mapping the natural language question into one or more semantic hypergraphs that capture one or more meanings behind the natural language question and performing an intent detection of one or more semantic hypergraphs by transforming the one or more semantic hypergraphs into one or more deductive database queries that capture the one or more intents behind the natural language question. The one or more semantic hypergraphs can be represented in a DOL language. The one or more deductive database queries can be represented in a DQL language.

According to yet another embodiment of the method, performing a semantic parsing of the natural language question by mapping the natural language question into one or more semantic hypergraphs that capture one or more meanings behind the natural language question further includes tokenizing the natural language question by breaking down the natural language question into a list of tokens, detecting named entities, assigning syntactic and/or semantic metadata to the tokens, creating temporary hypergraphs that will be used to hold all the intermediate transformations that are required to generate the semantic hypergraphs, performing syntactic joining by combining tokens using syntactic information associated to them, performing semantic joining by combining tokens using semantic information associated to them, performing semantic scope resolution by applying the right semantic scope for operations, whose syntactic and semantic scope usually diverge, and extracting the semantic hypergraphs from the temporary hypergraphs.

According to yet another embodiment of the method, performing an intent detection of one or more semantic hypergraphs by transforming one or more semantic hypergraphs into one or more deductive database queries that capture the one or more intents behind the natural language question further includes replacing zero or more individuals of the semantic hypergraph with variables, detecting the answer variables, building a deductive database query using the semantic hypergraph and the answer variables, and augmenting the deductive database query.

According to another embodiment, a system includes a natural language question compiler and a deductive database. The natural language question compiler is configured to receive a natural language question as an input and map the natural language question provided as an input into one or more deductive database queries that capture one or more intents behind the natural language question. The deductive database is configured to receive the mapped one or more deductive database queries as an input, compute one or more result sets of the natural language question using the one or more deductive database queries, and provide one or more result sets of the natural language question.

According to yet another embodiment of the system, the natural language question compiler includes a semantic parser and an intent detector. The semantic parser is configured to receive a natural language question as an input and perform a semantic parsing of the natural language question by mapping the natural language question into one or more semantic hypergraphs that capture one or more meanings behind the natural language question. The intent detector is configured to receive one or more semantic hypergraphs as input; and perform an intent detection of the one or more semantic hypergraphs by transforming the one or more semantic hypergraphs into one or more deductive database queries that capture the one or more intents behind the natural language question. The one or more semantic hypergraphs can be represented in a DOL language. The one or more deductive database queries can be represented in a DQL language.

According to yet another embodiment of the system, the natural language compiler is configured to tokenize the natural language question by breaking down the natural language question into a list of tokens, detect named entities, assign syntactic and/or semantic metadata to the tokens, create temporary hypergraphs that will be used to hold all the intermediate transformations that are required to generate the semantic hypergraphs, perform syntactic joining by combining tokens using syntactic information associated to them, perform semantic joining by combining tokens using semantic information associated to them, perform semantic scope resolution by applying the right semantic scope for operations, whose syntactic and semantic scope usually diverge, and extract the semantic hypergraphs from the temporary hypergraphs.

According to yet another embodiment of the system, the intent detector is further configured to replace zero or more individuals of the semantic hypergraph with variables, detect the answer variables, build a deductive database query using the semantic hypergraph and the answer variables, and augment the deductive database query.

According to another embodiment, a method includes receiving one or more ontologies and a fact database as inputs, loading and storing at least one ABox fact from the input ontologies in the fact database, deriving additional ABox facts using at least one TBox axiom contained in the input ontologies and the ABox facts contained in the fact database, and storing the derived ABox facts in the fact database. The ontologies can be represented in a DOL language.

According to another embodiment, a method includes receiving a deductive database query, one or more ontologies and a fact database as inputs, translating the deductive database query into an SQL query using the one or more ontologies, computing the results of the SQL query over the fact database, and providing the results of the deductive database query. The deductive database queries can be represented in a DQL language.

According to yet another embodiment of the method, deriving additional ABox facts using at least one TBox axiom contained in the input ontologies and the ABox facts contained in the fact database is performed by means of a complete reasoning method.

According to yet another embodiment of the method, deriving additional ABox facts using at least one TBox axiom contained in the input ontologies and the ABox facts contained in the fact database is performed by means of a complete reasoning method further includes converting the TBox axioms of the input ontologies into a rule set, rewriting the rules with function symbols with equivalent rules without function symbols, converting temporal rules into non-temporal rules, replacing the individuals referred to by name with individuals referred to by identifier, rewriting the regular rules with the precomputed join rules, removing from the rule set those rules containing predicates identified as nonmaterializable, unfolding the references to such predicates in the remaining rules, computing the strongly connected components of the rule set, generating an evaluation plan for evaluating all the strongly connected components, transforming the evaluation plan into an SQL script, and deriving the new ABox facts by executing the SQL script in the fact database.

According to yet another embodiment of the method, deriving additional ABox facts using at least one TBox axiom contained in the input ontologies and the ABox facts contained in the fact database is performed by means of an incremental reasoning method.

According to yet another embodiment of the method, translating the deductive database query into an SQL query using the one or more ontologies is performed by means of a basic query translation method, by means of an optimized translation method using EXISTS statements, or by means of an optimized translation method using nested subqueries.

According to another embodiment, a system includes a fact database, a reasoner and a query answering engine. The fact database is configured to load, store and retrieve ABox facts. The reasoner is configured to receive one or more ontologies and a fact database as inputs, derive additional ABox facts using at least one TBox axiom contained in the input ontologies and the ABox facts contained in the fact database, and store the derived ABox facts in the fact database. The query answering engine is configured to receive a deductive database query, one or more ontologies and a fact database as inputs, translate the deductive database query into an SQL query using the one or more ontologies, compute the results of the SQL query over the fact database, and provide the results of the deductive database query. The ontologies can be represented in the DOL language. The deductive database queries can be represented in a DQL language.

According to yet another embodiment of the system, the reasoner is configured to derive additional ABox facts using at least one TBox axiom contained in the input ontologies and the ABox facts contained in the fact database by means of a complete reasoning method. The reasoner can be further configured to convert the TBox axioms of the input ontologies into a rule set, rewrite the rules with function symbols with equivalent rules without function symbols, convert the temporal rules into non-temporal rules, replace the individuals referred to by name with individuals referred to by identifier, rewrite the regular rules with precomputed join rules, remove from the rule set those rules containing predicates identified as nonmaterializable, and unfolding the references to such predicates in the remaining rules, compute the strongly connected components of the rule set, generate an evaluation plan for evaluating all the strongly connected components, transform the evaluation plan into an SQL script, and derive the new ABox facts by executing the SQL script in the fact database.

According to yet another embodiment of the system, the reasoner is configured to derive additional ABox facts using at least one TBox axiom contained in the input ontologies and the ABox facts contained in the fact database by means of an incremental reasoning method.

According to yet another embodiment of the system, the query answering engine is configured to translate the deductive database query into an SQL query using the one or more ontologies by means of a basic query translation method, by means of an optimized translation method using EXISTS statements, or by means of an optimized translation method using nested subqueries.

The embodiments described above and herein are not the only embodiments of this invention. Features found in particular embodiments described herein can be combined with other embodiments described herein. Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of the invention may be realized by reference to the remaining portions of the specification, including sections and drawings, presented below. The Figures are incorporated into the detailed description portion of the invention.

DETAILED DESCRIPTION

Figure 1A:
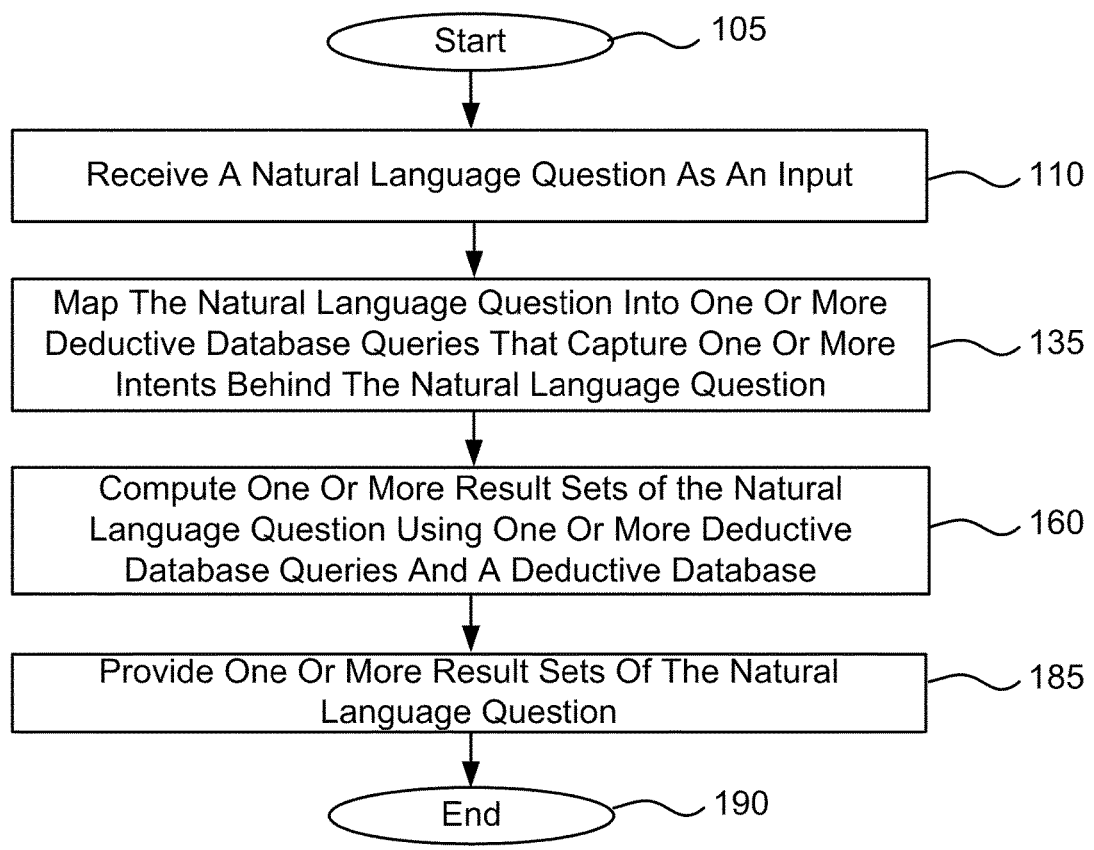
FIG. 1A is a flowchart illustrating a method of answering natural language questions that are provided as an input using deep semantics.

In the following description, for the purposes of explanation, specific details are set forth in order to provide a thorough understanding of the invention. However, it will be apparent that the invention may be practiced without these specific details.

Embodiments of the present invention provide systems and methods for answering natural language questions that are provided as an input, using deep semantics.

According to an embodiment, a method for answering natural language questions using deep semantics involves four steps:
a. Receiving a natural language question as an input,
b. Mapping the natural language question provided as an input into a logical form that captures the intent of the mentioned natural language question. This step is performed by the Natural Language Question Compiler (NLQC), as described below.
c. With the logical form obtained from the previous step, computing the results to the question. This step is performed by the Deductive Database (DDB), as described below.
d. Returning the results to the question produced by the Deductive Database (DDB)

Next, the Natural Language Question Compiler (NLQC) and the Deductive Database (DDB) are described in detail in sections 1 and 2. In addition, the different knowledge representation formalisms used extensively both in the natural language compiler and in the deductive database are also described in detail in section 3.

1. The Natural Language Question Compiler (NLQC)

The Natural Language Question Compiler (NLQC) is a component that takes a natural language question as an input and produces zero or more logical forms that capture the intent behind the natural language questions.

The method of compiling queries performed by the NLQC can be broken down into two steps:
  e. In the Semantic Parsing step, the goal is to map the natural language question into one or more semantic hypergraphs, wherein a semantic hypergraph is a logical form represented in DOL language that captures the meaning of the mentioned natural language question.
  f. In the Intent Detection step, the goal is to transform the semantic hypergraph obtained from the semantic parsing into one or more deductive database queries, wherein a deductive database query is a logical form represented in DQL language that represents the intent behind the original natural language question.

The deductive database query, represented in DQL language, uses the classes and individuals defined in the domain ontology. The domain ontology is the target ontology that contains all the knowledge accessible to the question answering system. It is stored in the deductive database and is used to answer the deductive database queries generated by the NLQC component.

Next, these steps are described in detail.

1.1. Semantic Parsing

The goal of the semantic parsing step is to map the natural language question into one or more semantic hypergraphs, wherein a semantic hypergraph is a logical form represented in DOL language that captures the meaning of the mentioned natural language question.

The semantic parsing step may generate more than one semantic hypergraph, wherein every different semantic hypergraph represents a different interpretation of the natural language question.

In addition to the semantic hypergraphs, the semantic parsing step generates a semantic graph score for every semantic graph, wherein the semantic graph score intuitively represents the probability of that particular semantic graph being the right interpretation for the natural language question.

The component in charge of performing the semantic parsing step is called semantic parser.

The semantic parser uses rules expressed in a logical language to perform the semantic parsing. The rules used by the semantic parser are included in three ontologies:
  1. The part-of-speech ontology (POS ontology): an ontology represented in the DOL language that describes the parts of speech present in natural languages and their relationships. For example, this ontology defines classes such as ProperNoun, CommonNoun and Adjective.
  2. The syntactic ontology: an ontology represented in the DOL language that describe syntactic relationships between parts of speech. For example, this ontology contains rules that describe how to form a relative clause. All the relations in the syntactic ontology are binary.
  3. The bridge ontology: an ontology represented in the DOL language that describes how classes or relationships of the domain ontology are realized in the natural language both from the syntactic and semantic point of view. Therefore, it uses the domain, POS and syntactic ontologies.

The semantic parsing method performed by the semantic parser can be broken down into 8 steps:

1. Tokenization: Includes tokenizing the natural language question, that is, breaking down the natural language query into a list of tokens called tokenized question.
  2. Named entity detection: Includes matching named entities (i.e. "New York") and grouping the matching tokens into a single token.
  3. Token metadata assignment: Includes, for each token in every tokenized question, retrieving and assigning the syntactic and/or semantic metadata associated to it (these metadata will be called token metadata or TM).
  4. Temporary hypergraph creation: Includes, for every tokenized question, creating a temporary hypergraph that will be used as a work area and that will contain all the intermediate transformations needed in order to generate the desired semantic hypergraphs.
  5. Syntactic joining: Includes, for every temporary hypergraph, combining tokens by using the syntactic information associated to them.
  6. Semantic joining: Includes, for every temporary hypergraph, combining tokens by using the semantic information associated to them.
  7. Semantic scope resolution: Includes, for every temporary hypergraph, performing a scope resolution process in order to apply the right semantic scope for operations, whose syntactic and semantic scope usually diverge
  8. Semantic graph extraction: Includes, for every temporary hypergraph, extracting the semantic hypergraph, which is the desired output of the semantic parsing.

Next, these steps are described in detail.

1.1.1. Tokenization

The natural language query is passed through a lexer that extracts a list of tokens using regular expressions. The resulting list of tokens is called tokenized question.

The tokenization step is language-dependent, and therefore a different lexer may potentially be needed for every supported language.

1.1.2. Named Entity Detection

The domain ontology contains names for individuals written in different natural languages. For example, an individual CITY_1234 that represents the city of London may contain several common names associated to it in different languages (i.e. "Londres" in Spanish, "London" in English and "Londra" in Italian, among others). The subset of the ontology that contains all the individuals that have associated at least one name in one natural language is called named entities ontology. Note that this division is purely logical, and done for the purposes of this document.

The goal of this step is to identify tokens that joined together occur in the named entities ontology. The input to this phase is a tokenized question. The output of this phase is a list of tokenized questions; each tokenized question represents one possible grouping of tokens in the original sentence that can be matched in the named entities ontology.

For example, if the tokenized question is ["hotel", "in", "new", "york", "near", "1st", "street"] and the named entities ontology contains the entities "new york", "york" and "1st street", the result of the named entity detection step is the following list of tokenized questions:

["hotel", "in", "new york", "near", "1st street"]
["hotel", "in", "new", "york", "near", "1st street"]
["hotel", "in", "new york", "near", "1st", "street"]
["hotel", "in", "new", "york", "near", "1st", "street"]

Given a tokenized question with T tokens, a naïve algorithm for detecting entities would generate all the possible combinations of adjacent tokens of lengths from 1 to T, and then these combinations would be matched against the named entities ontology.

The naïve algorithm is improved in two ways:
1. Although the naïve algorithm is fast enough for short questions, it starts to be very inefficient for large questions, due to the explosion in the number of potential combinations to be checked. Therefore, the search space is pruned by removing low-probability combinations, using factors like the number of tokens in the combination (the more tokens, the less probable is to find a suitable named entity), the n-gram frequency of the combination and the part-of-speech analysis, among others.
2. The matching process between the token combination and the named entities ontology is done with an approximate string matching algorithm, in order to support typos entered by users (i.e. an user typing "Picadilly" when referring to "Piccadilly"), partial specifications (i.e. an user typing "tower of pisa" when referring to "The Leaning Tower of Pisa") and other similar variations.

1.1.3. Token Metadata Assignment

The goal of this step is to retrieve and assign the token metadata for each token in every tokenized question.

The token metadata for a given token (i.e. "hotel") is represented by a hypergraph, called token hypergraph, that is composed by two subhypergraphs: the first, called syntactic token subhypergraph, contains lexico-syntactic metadata about the token in question (i.e. for the "hotel" token it may contain that it's a common noun), and the second, called semantic token subhypergraph, that contains the logical representation of the token according to the domain ontology (i.e. for the "hotel" token it may contain that the representation is (Hotel ?x)).

All the mappings between tokens and their metadata are stored collectively in a token metadata database.

More formally, the input to this step is a list of tokenized questions coming from the previous step. Then, for each token T in every tokenized question, T gets mapped to its token hypergraph as follows:
1. TM:=retrieve the token hypergraph associated to the token T from the token metadata database, using an approximate string matching algorithm as described in the previous section to perform the matches between T and the tokens in the token metadata database.
2. For each semantic token subhypergraph STS occurring in TM
   a. For each individual x occurring in STS that does not also occur in the domain ontology, replace x in STS with a fresh individual
3. Assign the token metadata TM to the token T The result of this phase is a list of tokenized questions, where each token in the tokenized question is associated with its syntactic and/or semantic metadata.

1.1.4. Temporary Hypergraph Creation

The goal of this step is to create and initialize temporary hypergraphs that will be used to hold all the intermediate transformations needed to generate the desired semantic hypergraph(s).

The input to this step is a list of tokenized questions obtained from the previous step. For each tokenized question, a blank temporary hypergraph is created.

After the creation of the blank temporary hypergraph, the token subhypergraphs for every token within the given tokenized question are copied into the temporary hypergraph.

In addition, all the tokens themselves, and other additional information like the position of the tokens in the natural language query) are linked to their corresponding token subhypergraphs as provenance information.

The output of this step is a list of temporary hypergraphs, one per every tokenized question present in the input list. Every temporary hypergraph will have as many disconnected subhypergraphs as tokens there are in the tokenized question used for its creation.

1.1.5. Syntactic Joining

The goal of this step is to combine as many tokens as possible, by joining the syntactic token subhypergraphs associated to them.

The input to the syntactic joining procedure is a list of temporary hypergraphs obtained from the previous step. Before starting the syntactic joining procedure, a temporary sorted queue Q is created, and every temporary hypergraph H in the input list is copied into the sorted queue Q, which will get automatically sorted using the semantic hypergraph score of the temporary hypergraphs.

The procedure goes as follows:
1. Result:=∅
2. While Q is not empty
   a. Pop a temporary hypergraph H from the head of Q.
   b. Project the hypergraph H into a temporary list $L=[TMAP_1 \ldots TMAP_m]$, containing the mappings between tokens and their corresponding token hypergraphs G for each token T in H, wherein the list is created according to the token order in the tokenized question used to create the temporary hypergraph.
   c. If m=1, add H to Result and go to a
   d. Let i=1
   e. Let $TMAP_i=[T_i \rightarrow (G_{i,1}, s_{i,1}), \ldots, (G_{i,ni}, s_{i,ni})]$ and let $TMAP_{i+1}=[T_{i+1} \rightarrow (G_{i+1,1}, s_{i+1,1}), \ldots, (G_{i+1,ni+1}, s_{i+1,ni+1})]$, where $T_i$ represents the i-th token of L, and $s_i$ represents the semantic graph score for the token hypergraph
   f. For j=1 to $n_i$ and k=1 to $n_{i+1}$
      i. Compute $(G_{i,j}, s_{i,j}) \oplus (G_{i+1,k}, s_{i+1,k})$ (the subhypergraph joining operation $\oplus$ is described below)
      ii. If the result of the previous operation is not empty and the score of the combined token hypergraph $(G_{i,j}, s_{i,j}) \oplus (G_{i+1,k}, s_{i+1,k})$ is higher than a predefined threshold, then do the following:
         1. Let TMAP be the following token mapping: $TMAP=[T_i \oplus T_{i+1} \rightarrow (G_{i,j}, s_{i,j}) \oplus (G_{i+1,k}, s_{i+1,k}]$
         2. Create the list $[TMAP_1, \ldots, TMAP_{i-1}, TMAP, TMAP_{i+2}, \ldots, TMAP_m]$
         3. Create a new temporary hypergraph $H_2$ using the list generated in the previous step and add $H_2$ to Q
   g. If some temporary hypergraph $H_2$ was added as per the inner loop described above, then go to a
   h. Increase i; if i<m−1, then go to e
   i. Now repeat steps e to h, but trying to join tokens in reverse order, that is, iterating i from m to 2 instead of iterating it from 1 to m−1.
   j. If during step i, the part that corresponds to "then go to e" from step h is not executed, then we add H to Result (that means that we're not able to join anything else in H, neither going forward or backwards through its projection L).

When the process terminates, Result will contain a list of temporary hypergraphs. The hope is that most of the subhypergraphs within the temporary hypergraph are connected, which means that all the tokens were successfully joined. However, some temporary hypergraphs can contain disconnected subhypergraphs, which means that some tokens could not be joined.

1.1.5.1. The Subhypergraph Joining Operation (⊕)

An important building block of the translation is the subhypergraphs joining operation, denoted as ⊕. This operation is given two well-formed token hypergraphs $G_1$ and $G_2$ (well-formed is defined below) with associated scores $s_1$ and $s_2$. The goal of this operation is to combine $G_1$ and $G_2$ into a new, combined hypergraph. The result of the procedure is written $(G_1, s_1) \oplus (G_2, s_2)$, and it is a possibly empty list of hypergraph-probability pairs; that is, $$(G_1, s_1) \oplus (G_2, s_2) = [(H_1, r_1), \ldots, (H_n, r_n)]$$

The list can be empty if $G_1$ and $G_2$ cannot be joined. The combined token hypergraphs will all be well-formed.

The syn projection of a hypergraph H, called $H_{|syn}$, is the subset of H that contains precisely the assertions of H whose predicate occurs in the syntactic ontology.

A hypergraph H is said to be well-formed when $H_{|syn}$ is either empty or it is a directed tree (with a single root). Note that if $H_{|syn}$ is empty, then H contains only one individual or variable.

The operation $(G_1, s_1) \oplus (G_2, s_2)$ is directional, that is, $(G_1, s_1) \oplus (G_2, s_2)$ is not the same as $(G_2, s_2) \oplus (G_1, s_1)$ Let H be a hypergraph, let x be an individual, let C be a class, and let O be an ontology. We say that x is an instance of C in H with respect to O if H contains an assertion (D x) such that D is a subclass of C in O (the latter is tested by looking at the transitive closure of the class hierarchy in O).

Let H be a hypergraph, let $x_1$ and $x_2$ be individuals, let R be a binary relation and let O be an ontology. We say that $x_1$ and $x_2$ can instantiate R in H with respect to O if g. O contains an axiom of the form (relationDomain 1 R C) and $x_1$ is an instance of C in H with respect to O, and h. O contains an axiom of the form (relationDomain 2 R D) and $x_2$ is an instance of D in G with respect to O.

Let x be an individual or variable occurring in a well-formed token hypergraph G. x is the syn-root (respectively syn-leaf) of G if either $G_{|syn}$ is empty, or if x is a root (respectively leaf) of the directed tree $G_{|syn}$.

The procedure for calculating $(G_1, s_1) \oplus (G_2, s_2)$ goes as follows:
1. Result:=∅
2. Let $r_2$ be the syn-root of $G_2$.
3. Let Q be the set of syn-leaves of $G_1$ that were introduced by a token that is closest to the token of $r_2$ in the natural language query. This is done by looking at the provenance information mentioned before.
4. While Q is not empty
   a. Pop an individual $i_1$ from Q
   b. For each binary relation R from the syntactic ontology such that $i_1$ and $r_2$ can instantiate R in G with respect to O
      i. Compute the score s, that represents the likelihood of the union of $G_1$ and $G_2$ via (R $i_1$ $r_2$). The score is calculated by computing the value of a function (manually created or machine learned) that operates over various features, each of which is computed by looking at $G_1$, $G_2$, R, $i_1$, and $r_2$.
      ii. If s is not −1 (a special score that says "the join cannot be performed") and s is above a certain threshold
         1. Compute $G = G_1 \cup G_2 \cup \{(R\ i_1\ r_2)\}$
         2. Add (G, s) to Result
   c. Add the parent of $i_1$ to Q if it exists.

1.1.6. Semantic Joining

The goal of this step is to combine as many tokens as possible, by joining the semantic token subhypergraphs associated to them.

This step takes as input a list of temporary hypergraphs. For each temporary hypergraph, the process adds all the assertions that are obtained by firing the rules from the bridge ontology. After this step, all the token hypergraphs within the temporary hypergraphs are still well formed, that is, the rules do not add any syntactic relation.

1.1.7. Semantic Scope Resolution

The objective of this step is to perform a scope resolution process in order to apply the right semantic scope for operations whose syntactic and semantic scope diverge.

Logical operations like and, or, not and other operations like quantifiers, existentials and aggregates can be represented by means of atoms at a syntactic level, but cannot be properly represented as atoms at a semantic level, because the semantic scope of the operations would be ambiguous (operations apply over expressions, and an atom cannot apply over arbitrary expressions).

Let M be the set of predicates belonging to the syntactic ontology that are subject to semantic scope resolution. As described above, M may contain predicates like and, or, not and exists, quantifiers and aggregates, among others. These predicates represent syntactically their operation counterparts.

This step will replace in H any occurrences of syntactic predicates of M by an equivalent external operator from a set N (that is, a syntactic predicate like and will have an equivalent external operator $and_e$). Therefore, H will be converted into a canonical form H of the form $H_1\ op_1\ H_2\ op_2\ \ldots\ op_{k-1} H_k$, where the elements $op_i$ are external operations that belong to the set N, and $H_i$ are subhypergraphs of H. In the resulting canonical form, every external operation has a clearly defined scope (one or more subhypergraphs $H_i \subseteq H$).

The sem-projection of a hypergraph H, called $H_{|sem}$, is the subhypergraph of H that contains precisely the assertions of H whose predicate occurs in the domain ontology.

The sc-projection of a hypergraph H, called $H_{|sc}$ is the subhypergraph of $H_{|syn}$ that contains precisely the assertions of H whose predicate occurs in M.

The input to the syntactic joining procedure is a list of temporary hypergraphs obtained from the previous step. For every temporary hypergraph H, the procedure goes as follows:
1. Build a map B that contains the following entries:
   a. For every variable or individual x contained in the assertions contained in $H_{|sc}$, create an entry whose key is x and whose value is a pair containing the following elements:
      i. the external operation associated to the predicate of the syntactic ontology of the assertion where x is contained
      ii. the set of individuals and variables that can be reached by traversing $H_{|syn}$ using x as root
   b. Add also a special entry with key root and whose value is a pair containing the following elements:
      i. the external operation $and_e$
      ii. a set with all the individuals and variables present in H
2. Let I=B[root], that is, we assign to/the tuple located as value of the map entry with key root of the map B 3. Let expand(B, R, S) be the function that takes the map B defined above as the first argument and two pairs R and S (where $S \subseteq R(2)$), and performs the following steps:
   a. For every x in S(2) (the S(2) represents the $2^{nd}$ element in the pair S)
      i. If B[x] exists
         1. Let T=B[x]
         2. For every y in T(2), remove y from R(2) (and recursively from any the sets included in R(2))
         3. Add T as a member of S(2)
         4. Perform expand(B, R, T)
4. Remove from H all the assertions contained in $H_{|sc}$
5. Perform expand(B, I, I), obtaining a canonical form $H'=H_1\ op_1\ H_2\ op_2 \ldots op_{k-1}H_k$, where:
   a. $H_1 \cup H_2 \cup \ldots \cup H_k = H$
   b. $H_i$ doesn't contain any of the predicates of the assertions contained in $H_{|sc}$
   c. $\{op_i | 1 \leq i \leq k-1\}$ is equivalent to the set of predicates contained in the assertions of $H_{|sc}$ The output of this step is a list of temporary hypergraphs, where the assertions with predicates from the set M are removed from every temporary hypergraph H and a canonical form $H_1 op_1\ H_2 op_2 \ldots op_{k-1}H_k$ is generated instead.

1.1.8. Semantic Graph Extraction

The goal of this step is to extract the semantic hypergraphs from the temporary hypergraphs. The semantic hypergraphs are the desired output from the semantic parsing.

This step simply iterates through the temporary hypergraphs, and then extracts and returns the $G|_{sem}$ projections, which, at this point of the process, correspond with the desired semantic hypergraphs.

1.2. Intent Detection

The goal of the intent detection step is to transform the semantic hypergraphs obtained from the semantic parsing into one or more deductive database queries, which represent the intent behind the original natural language question.

The intent detection method includes 4 steps:
1. Variable Replacement: Includes, for every semantic hypergraph, replacing zero or more of the individuals of the semantic hypergraph with variables.
2. Answer Variable Detection: Includes, for every semantic hypergraph, detecting the variables that can be made answer variables, that is, the variables that can be safely included in the answer variable section of the query
3. Deductive Database Query Creation: Includes, for every semantic hypergraph, building a deductive database query using the semantic hypergraph and the answer variables.
4. Deductive Database Query Augmentation: Includes, for every deductive database query, augmenting the query with, for example, new predicates, sorting criteria and/or new answer variables.

Next, these steps are described in detail.

1.2.1. Variable Replacement

The goal of this step is to replace zero or more of the individuals of the semantic hypergraph with variables.

This step takes as input a list of semantic hypergraphs. For each hypergraph G, G is modified as follows:
1. For each individual x occurring in G
   a. If x does not occur in the domain ontology
      i. Replace x in all expressions of G by a fresh variable 1.2.2. Answer Variable Detection The objective of this step is detecting the set of variables that can be made answer variables, that is, the set of variables that can be safely included in the answer variable section of the query.

This step takes as input a list of semantic hypergraphs, and for every semantic hypergraph the set of answer variables is determined as follows:
1. Result:=∅
2. For each variable x occurring in G
   a. If x is bound (or produced) by G
      i. Add x to Result The output of this step is a list of deductive database queries and another list with their respective sets of answer variables.

1.2.3. Deductive Database Query Creation

This step takes as input a list of semantic hypergraphs and their associated answer variables. Then, for every semantic hypergraph G, that has the form $G_1op_1\ G_2op_2 \ldots op_{r-1}G_r$, a deductive database query of the form $((V_1 \ldots V_k)op_1\ (E_1) \ldots op_{r-1}(E_r))$ is built, where $V_1, \ldots V_k$ is the set of answer variables of G, $op_1 \ldots op_{r-1}$ are the external operations of G and $E_1 \ldots E_r$ is the set of expressions derived from $G_1 \ldots G_r$.

The output of this step is a list of deductive database queries.

1.2.4. Deductive Database Query Augmentation

The objective of this step is to augment the deductive database query with, for example, new predicates, sorting criteria and/or new answer variables.

This step takes as input a list of deductive database queries and a list of horn clauses $H_1 \ldots H_k$ wherein every rule $H_i$ has the form $A_1 \wedge \ldots \wedge A_n \rightarrow B$. The general idea is that, for a given query Q and a given horn rule $H_i$, the antecedent $A_1 \wedge \ldots \wedge A_n$ contains the expressions to match against Q (i.e. we check if the expression $A_1 \wedge \ldots \wedge A_n$ occurs in the query), and if a match is produced, then the operation in B is performed against the query.

For every deductive database query Q, Q is modified as follows:
1. For each horn rule $H_i$ in $H_1 \ldots H_k$,
   a. If $A_1 \wedge \ldots \wedge A_n$ matches Q
      i. If B contains an atom of the type (assert E), then we add an additional expression E to the query Q
      ii. If B contains an atom of the type (retract E), then we remove the expression E from Q
      iii. If B contains an atom of the type (add-var ?V), then we add the variable ?V to the answer variables of Q
      iv. ...

The output of this step is a list of deductive database queries.

2. The Deductive Database (DDB)

The DDB system implements the following functionality:
1. It provides users with a flexible knowledge representation language called DOL that can be used to model complex domains. This knowledge representation language allows one to make formal statements about the world, such as "concert halls are places of entertainment," or facts about concrete objects such as "Carnegie Hall is a kind of a concert hall." Statements describing a domain of interest are called axioms, and a collection of axioms describing a domain is called an ontology.
2. It also provides support for inferencing—the derivation of new facts from existing ones. For example, given a statement that "hotels are a kind of accommodation" and a fact that "Savoy is a hotel," the DDB can infer that "Savoy is a kind of accommodation." Inferencing is sometimes synonymously called reasoning.
3. The DDB system further provides a flexible language that can be used to formulate complex queries, such as "retrieve the cheapest 50 hotels in European cities close to beaches".
4. Additionally, the DDB implements means for evaluating such queries and retrieving the objects that satisfy the specified conditions.

2.1. DDB and RDBMSs (Relational Database Management Systems)

In some embodiments, DDB can be implemented on top of the relational database management systems (RDBMSs), from which it reuses the features of data storage, data indexing and planning/evaluation of queries. The DDB implements its knowledge representation and reasoning features on top of these features.

In some embodiments, the DDB supports inferencing via materialization. In some embodiments, before answering a single query, the DDB computes all consequences of the axioms and stores the pre-computed consequences in the RDBMS. All consequences that a DDB-based application might be interested in are thus made readily available, which significantly reduces the time required for query processing. From the implementation perspective, inferencing is realized by compiling the relevant axioms into an SQL script that is then evaluated by the RDBMS.

Additionally, in some embodiments, the DDB supports inferencing at query time. In some embodiments, some predicates can be marked with the nonmaterializable directive present in the DOL language. The DDB won't materialize the consequences of this predicate, deferring it to query time, when a query executed against the DDB is using a nonmaterializable predicate. This is particularly useful for predicates whose materialization is infinite or is too big to be practical.

Querying DDB ontologies can be realized by translating DDB queries into SQL queries. The DDB thus reuses the RDBMS query optimizer for identifying the most efficient way of evaluating the query, and the RDBMS query evaluation engine for actually computing the query result.

2.2. Data Storage Scheme

The DOL knowledge representation language of the DDB described herein allows one to describe a domain of interest by means of one or more ontologies, where each ontology consists of axioms. Ontologies can be stored into text files using the syntax described herein. In one embodiment, in order to process these ontologies (i.e., to infer new facts based on the ontology axioms or to answer queries), the ABoxes of ontologies (i.e., the facts) are loaded into a RDBMS. This section describes the scheme that is used to store facts in RDBMS.

One task of the data storage module is to store a large number of facts, which can have one of the following forms (in the latter two cases, predicate P must be declared as being temporal):

$$(Ps_1 \ldots s_n) \tag{83}$$

$$(\text{HOLDS\_AT}(Ps_1 \ldots s_n)t) \tag{84}$$

$$(\text{HOLDS\_EVERYWHERE}(Ps_1 \ldots s_n)t_1 t_2) \tag{85}$$

2.2.1. Storage of Nontemporal Facts

If P is not temporal, then facts involving P are stored in one RDBMS table called ddb_P. The number of columns in ddb_P is equal to the arity of P, and columns are named $a_0$, $a_1$, .... The SQL type of a column i of ddb_P is determined by the datatype of the ith argument of P.

Individuals are identified in the DOL language by a string. To optimize storage of individuals, instead of storing these strings directly, the DDB maps the strings to integers called individual IDs. To be able to access the individual's name based on the individual's ID, the DDB maintains a table called _individual_mapper, which maps IDs to individuals and vice versa. The IDs are assigned to the strings using a hash algorithm.

In addition to P, the DDB maintains predicates BP$ins and BP$del, which are used to store facts that are to be added/removed incrementally. This feature allows one to add/remove facts with the P predicate without re-computing all inferences from scratch. To add or delete a fact of the form (83), one should add one of the facts (86) or (87), respectively, and then run the incremental inferencing algorithm described herein. The latter step will then update P accordingly and will propagate updates to all other predicates as necessary. This process takes much less time than re-computing all inferences from scratch.

$$(P\$ins\ s_1 \ldots s_n) \tag{86}$$

$$(P\$del\ s_1 \ldots s_n) \tag{87}$$

2.2.2. Storage of Temporal Facts

The storage scheme is slightly different for facts of the form (84) and (85), where P is a temporal predicate. In particular, such facts are first transformed into regular (i.e., nontemporal) facts (88) and (89), respectively. The predicate P$tf is not temporal, and its last two arguments are of datatype TIMESTAMP. Such facts are then stored as described earlier.

$$(P\$tfs_1 \ldots s_n tt) \tag{88}$$

$$(P\$tfs_1 \ldots s_n t_1 t_2) \tag{89}$$

For example, an ontology contains the following two temporal facts:

(HOLDS_EVERYWHERE(marriedTo Peter Mary)

(TIMESTAMP "2001-05-16 08:50:00Z")

(TIMESTAMP "2006-08-13 20:50:00Z"))  (90)

(HOLDS_EVERYWHERE(marriedTo Peter Mary)

(TIMESTAMP "2004-05-16 12:50:00Z")

(TIMESTAMP "2009-08-13 19:40:00Z"))  (91)

will be converted into the following temporal facts, which will then be stored in a table called ddb_marriedTo$tf as described earlier:

(marriedTo$tf Peter Mary (TIMESTAMP "2001-05-16 08:50:00Z")

(TIMESTAMP "2006-08-13 20:50:00Z"))  (92)

(marriedTo$tf Peter Mary (TIMESTAMP "2004-05-16 12:50:00Z")

(TIMESTAMP "2009-08-13 19:40:00Z"))  (93)

In addition, the DDB will also use a nontemporal predicate P$maxint to store facts with maximal validity time intervals. For example, the DDB will combine facts (90) and

(91) into the following single fact, which represents the maximum time interval in which Peter was married to Mary.

(marriedTo$max *int* Peter Mary (TIMESTAMP "2001-05-16 08:50:00Z")

(TIMESTAMP "2009-08-13 19:40:00Z"))  (94)

Facts such as the one above should never be explicitly added to the DDB. The DDB maintains such facts internally during reasoning and querying.

Finally, the DDB also maintains predicates BP$tf$ins and BP$tf$del to facilitate incremental addition or deletion of temporal facts. To incrementally add or delete a temporal fact of the form (85), one should simply insert one of the following two facts, respectively.

(HOLDS_EVERYWHERE(P$ins $s_1 \ldots s_n)t_1t_2$)  (95)

(HOLDS_EVERYWHERE(P$del $s_1 \ldots s_n)t_1t_2$)  (96)

The above facts will be transformed into the following ones, which will then be handled as nontemporal incremental additions/deletions.

(P$tf$ins $s_1 \ldots s_n tt$)  (97)

(P$tf$del $s_1 \ldots s_n t_1 t_2$)  (98)

2.2.3. Storage of Auxiliary Predicates

During reasoning, the DDB maintains auxiliary predicates of other types. Let P be a predicate. If P is temporal, then let BP be P; otherwise, let BP be P$tf. During reasoning, the DDB may introduce predicates BP$old, BP$delta_old, BP$delta_new and BP$current. The corresponding tables, however, are not persistent and are used only during the reasoning process. The usage of these will be explained in the sections on inferencing

2.2.4. Storage of Functional Terms

In some embodiments, if a function F has arity n, then the DDB introduces a table ddb_F of arity n+1, where the last argument is of datatype INDIVIDUAL. Functional terms are then stored as rows in this table. This is best explained with an example. Consider an ontology that contains the following axioms.

(class Broken)  (99)

(function leftHand INDIVIDUAL)  (100)

(Broken(leftHand Peter))  (101)

Axiom (101) contains a functional term, which cannot be stored directly into the ddb Broken table. To this end, the DDB introduces a new individual that represents (leftHand Peter). The name of such an individual is generated using a hash of the term, which is denoted as sk:1. Introducing fresh individuals for ground terms can be done using skolemization. The DDB will then transform (101) into the following two assertions:

(Broken *sk*:1)  (102)

(leftHand Peter *sk*:1)  (103)

This transformation is reversed during querying. For example, to answer query (104), the DDB preprocesses the query into (105).

((?X)(Broken(leftHand?X)))  (104)

((?X)(Broken?Y)(leftHand?X?Y))  (105)

These transformations can thus be used to eliminate function terms from facts, queries, and rules, so the reasoning and query answering algorithms need not concern themselves with function terms.

2.3. Complete Reasoning in the DDB

After loading the facts from an ontology into a database, one can use the ontology axioms to derive additional facts. This process is called reasoning and is described in more detail in this section. This section describes complete reasoning (i.e. reasoning under the assumption that no facts were concluded preciously). In other words, this process ignores the predicates of the forms P$ins and P$del, which are used for incremental reasoning.

The input to the reasoning process is an ontology set and a RDBMS database containing the facts. The reasoning process then completes the database with the facts that are not explicitly present but are implied by the ontology axioms.

To facilitate reasoning, all TBox axioms in the ontology set are first transformed into a set of rules R as explained herein. Next, the DDB transforms R into a SQL script which can be used to compute the implied facts. Finally, the script is executed and the missing facts are derived.

The next sections describe in more detail how, given a set of rules R and a set of facts F, all facts that are implied by R and F can be computed. This operation is called saturation. As explained herein, temporal facts are converted into nontemporal facts, and therefore, no particular attention needs to be paid to reasoning with temporal facts. Instead, precautions are taken to ensure the extensions of predicates P$maxint are correctly updated after reasoning.

2.3.1. A Naïve Saturation Algorithm

Before presenting the actual reasoning algorithm, it is instructive to first consider a very naive, but simple saturation algorithm. Let R be the set of rules (106)-(108), and let F be the set of facts (109)-(113).

(<=(C?X)(and (A?X)(B?X)))  (106)

(<=(S?X?Y)(R?X?Y))  (107)

(<=(C?Y)(and (S?X?Y)(C?X)))  (108)

(Aa)  (109)

(Ba)  (110)

(Sab)  (111)

(Sbc)  (112)

(Scd)  (113)

An application of a rule to a set of facts consists of replacing all variables in a rule with ground terms such that all antecedent atoms (with variables replaced) are contained in the set of facts, and then deriving the consequent atom (with variables replaced with the same values). For example, an application of rule (106) to facts (109) and (110) derives the following fact:

(Ca)  (114)

If $A_R(F)$ is the result of all possible applications of the rules in R to the facts in F, then in the above example, $A_R(F)$ contains facts (109)-(117).

(Rab)  (115)

(Rbc)  (116)

(Rcd)  (117)

Now the derivation of facts (114)-(117) enables the derivation of further facts. Applying R to $A_R(F)$ produces $A_R(A_R(F))$, which consists of facts (109)-(118). One more application produces $A_R(A_R(A_R(F)))$, which consists of facts (109)-(119).

(Cb)  (118)

(Cc)  (119)

An application of R to $A_R(A_R(A_R(F)))$ set does not produce any more facts, so the reasoning process terminates at this point.

If F is a set of facts stored as described herein and r is a rule, then the rule r can be applied to F by translating r into an SQL statement of the form INSERT INTO . . . FROM SELECT . . . . For example, rule (106) is translated into (120), and rule (108) is translated into (121).

INSERT INTO ddb_C(a0)FROM

SELECT a0 FROM ddb_A t1,ddb_B t2
    WHERE t1·a0=t2·a0  (120)

INSERT INTO ddb_C(a0)FROM

SELECT a1 FROM ddb_St1,ddb_Ct2
    WHERE t1·a1=t2·a0  (121)

The translation used by the DDB is slightly more complex as it must ensure that no duplicate tuples are added to the resulting table. Thus, the naive reasoning algorithm described above can be implemented simply by running statements such as (120) and (121) in a loop until no further tuples are added.

Computing $A_R(A_R(F))$ using this algorithm derives all facts that were derived during the previous computation of $A_R(F)$. In other words, each subsequent application of the rules repeats all the work done by the previous rule applications, which can cause performance problems during reasoning and can therefore be further improved. The following sections describe techniques used for further improvement.

2.3.2. Computing the SCCs

The first optimization can be obtained by noticing that rule (107) contains the predicate S in the head, which occurs in all other rules in the body. Thus, one can apply rule (107) once, and one does not need to keep applying this rule when computing the consequences of (106) and (108). Furthermore, only rule (108) contains the same predicate in the head and the body; such rules are said to be recursive. Only such rules need to be applied iteratively, whereas nonrecursive rules, such as (106), can be applied only once.

The DDB uses the technique of computing a predicate dependency graph. For a rule set R, one creates a directed graph $G_R$ in which every predicate occurring in R is a vertex. Furthermore, the graph contains an edge from $P_1$ to $P_2$ if and only if R contains a rule where $P_1$ occurs in the antecedent and $P_2$ occurs in the consequent. The strongly connected components (SCCs) of $G_R$ (e.g., using the Tarjan's algorithm) are then computed. A sequence of sets of predicates $P_1, \ldots, P_k$, where all predicates in each $P_i$ are mutually recursive, are obtained. However, these predicates can all be fully computed before computing a predicate from some $P_j$ with i<j. To perform all inferences, the DDB simply considers each $P_i$ in the increasing order of i and applies all the rules from R with a head predicate contained in $P_i$, as is further described herein.

2.3.3. Processing a SCC

This section explains how to compute all facts involving predicates in some SCC K, where K is a set of mutually recursive predicates.

In the running example from previous sections, one SCC could contain only the predicate C. Since rule (106) is nonrecursive (i.e., it does not contain C in the antecedent), whereas rule (108) is recursive, rule (106) can be evaluated only once before (108).

The DDB first computes the following subsets of R. The subset $R^{nr,K}$ contains each rule from R that contains a predicate from K in the consequent, but whose antecedent contains no predicate from K. The subset $R^{r,K}$ contains each rule from R whose antecedent and consequent both contain a predicate from K. The nonrecursive rules from $R^{nr,K}$ are next evaluated as explained herein. The rest of this section describes the evaluation of the recursive rules form $R^{r,K}$. The technique described here prevents the derivation of the same facts over and over.

Instead of evaluating the rules in $R^{r,K}$, the DDB evaluates a slightly modified set of rules, as follows. For each predicate P occurring in K, the DDB introduces the temporary predicates P$delta_new, P$old, and P$delta_old. If A is an atom containing predicate P and X is one of delta_new, old, and delta_old, the atom A$X is the same as A but the predicate is replaced with P$X. Let r be a rule of the form $(<=H(\text{and } B_1 \ldots B_i \ldots B_n))$  (122)

and let i be and integer such that $B_i$ contains a predicate in K. Then, $r^i$ is the rule obtained from r by the following modifications:

1. Atom H is replaced with H$delta_new
  2. For each $1 \le j < i$ such that $B_j$ contains a predicate in K,
    a. Replace atom $B_j$ with $B_j$$old.
  3. Atom $B_i$ is replaced with $B_i$$delta_old.

To compute the consequences of $R^{r,K}$ the DDB then proceeds as follows.

1. For each predicate $P \in K$ all facts initially contained in P are copied to P$delta old.
  2. For each $r \in R^{r,K}$ of the form (122) and each i such that $B_i$ contains a predicate in K
    a. The rule $r^i$ is evaluated as explained herein, but with a minor modification: a fact A$delta_new derived in this way is kept only if A$delta_new∉F and A∉F. This modification ensures that P and P$delta_new do not contain duplicate facts.
  3. If P$delta_new is empty for each $P \in K$, then the algorithm terminates.
  4. For each predicate $P \in K$, the following actions are performed:
    a. All facts in P$delta_old are copied into P$old.
    b. P$delta_old is emptied.
    c. All facts in P$delta_new are copied into P$delta_old.
    d. All facts in P$delta_new are copied into P.
    e. P$delta_new is emptied.
  5. The process is repeated from step 2.

The above described process can be slightly optimized. A rule is said to be linear-recursive if it contains exactly one atom with a predicate from K in the antecedent. Consider now a predicate $P \in K$ that occurs solely in linear-recursive rules in $R^{r,K}$. Then, no rule involved in Step 2 of the above algorithm will actually contain P$old in the body, so this predicate need not be maintained during the reasoning procedure.

2.3.4. Optimization for Transitivity

Algorithm described herein can be optimized in the case of a binary relation that is defined to be transitive. More precisely, the optimization is applicable if the following conditions are satisfied:

i. K contains exactly one predicate P.
j. The set of rules Rnr,K is empty, and
k. The set of rules Rr,K contains only one rule of the form (123).

$$(<=(P?X?Z)(\text{and }(P?X?Y)(P?Y?Z))) \quad (123)$$

When applied to a rule of the form (123), the algorithm described herein in the section under the header labeled Processing a SCC, evaluates two rules in Step 2 of each iteration. In contrast, the optimization presented in this section evaluates just a single rule per iteration step.

The algorithm uses temporary predicates P$current, P$delta_old, and P$delta_new, and proceeds as follows.

1. All facts in P are copied into P$current.
2. All facts in P are copied into P$delta_old.
3. The following rule is evaluated:

$$(<=(P\$delta\_new?X?Z)$$
$$(\text{and}(P\$delta\_old?X?Y)(P\$current?Y?Z))) \quad (124)$$

This is done as described in Section 5.2, but with a slight modification: a fact A$delta_new derived in this way is kept only if A∉F.
4. If P$delta_new is empty, then the algorithm terminates.
5. P$delta_old is emptied.
6. All facts in P$delta_new are copied into P$delta_old.
7. All facts in P$delta_new are copied into P.
8. P$delta_old is emptied.
9. The process is repeated from step 3.

The intuition behind this algorithm is as follows. Assume that we want to compute the consequences of (123), but in a situation where P does not initially contain any facts. Thus, we assume that all facts are initially contained in a binary relation R. In effect, the consequences of the set of rules containing (123) and (125) are computed.

$$(<=(P?X?Y)(R?X?Y)) \quad (125)$$

The computation result does not change if rule (123) is replaced with the linear-recursive rule (126).

$$(<=(P?X?Z)(\text{and}(P?X?Y)(R?Y?Z))) \quad (126)$$

The algorithm outlined above does precisely that: Step 1 copies the contents of P into an auxiliary relation P$current (which plays the role of R in the above example), and Step 3 evaluates rule (124) using the algorithm described herein in the Processing a SCC section, which essentially corresponds to the evaluation of (126).

2.4. Incremental Reasoning in the DDB

Let F be a set of facts and R a set of rules, and let F' be the set of facts computed from F and R using the algorithms described herein including those described after the section titled Complete Reasoning in the DDB. Assume furthermore that one wants to extend F with a set of facts ΔF, where ΔF is "small" in size when compared to F, with the goal of computing all the facts that follow from F∪ΔF and R. One possibility to achieve this goal is to add ΔF to F' and then apply the algorithms described herein including those described after the section titled Complete Reasoning in the DDB. Doing so, however, is unlikely to be very efficient, as the algorithm will essentially recompute F'.

The situation is even worse if ΔF is to be removed from F. The only solution is to throw away F' and apply the algorithms described herein including those described after the section titled Complete Reasoning in the DDB to F\ΔF, which essentially recomputes most of F'.

In order to achieve efficiency in such situations, the DDB supports incremental reasoning, by means of supporting incremental additions and deletions. The goal is to update F' with as little work as possible, in the hope that the amount of work will be proportional to the size of ΔF. The implementation of this feature is described below.

Incremental updates are performed in two stages. First, the user specifies which facts should be added and/or deleted. Second, the user instructs the DDB to actually propagate the updates and add and/or delete the facts. At this point, the DDB computes the consequences of the added and/or deleted facts, and adds and/or removes them as well.

Let A be a fact of the form (127). To specify that A should be incrementally added to the DDB, one should simply add the fact (128). Similarly, to specify that A should be incrementally removed from the DDB, one should simply add the fact (129).

$$(P s_1 \ldots s_n) \quad (127)$$

$$(P\$ins\ s_1 \ldots s_n) \quad (128)$$

$$(P\$del\ s_1 \ldots s_n) \quad (129)$$

The situation is similar for temporal facts. Let A be of the form (131). To add, respectively delete, A, one must add, respectively delete, (132) and (133); the situation is analogous for HOLDS_EVERYWHERE facts.

$$(\text{HOLDS\_AT}(P\ s_1 \ldots s_n)t) \quad (131)$$

$$(\text{HOLDS\_AT}(P\$ins\ s_1 \ldots s_n)t) \quad (132)$$

$$(\text{HOLDS\_AT}(P\$del\ s_1 \ldots s_n)t) \quad (133)$$

As explained herein including after the section titled Data Storage Scheme, facts (132) and (133) get converted into nontemporal facts involving P$tf$ins and P$tf$del predicates. Therefore, no particular attention needs to be paid to reasoning with temporal facts. Instead precautions are taken to ensure that the extensions of predicates P$maxint are correctly updated after reasoning.

After the batch of facts to be inserted and/or deleted has been prepared, one can instruct the DDB to propagate these updates into the main predicates. The DDB achieves this by generating a SQL script that performs the necessary modifications. After the script is run, all predicates will have been updated, and all predicates P$ins and P$del will have been emptied.

The rest of this section describes the actual incremental update algorithm. The algorithm proceeds in two distinct steps: it first propagates deletions, after which it propagates insertions.

2.4.1. Incremental Deletions

This section describes the incremental deletions step, which computes the upper bound on the facts that need to be deleted, and it "seeds" the P$ins predicates with the facts that might potentially need to be derived again. The algorithm proceeds as follows.

First, the algorithm transforms the rule set R into a rule set $R^{del}$. This is done by converting each rule of the form (135) into n rules of the form (136), for each $1 \leq i \leq n$. $R^{del}$ computes the facts that depend on ΔF and that might therefore need to be deleted.

$$(<=H(\text{and}\ B_1 \ldots B_i \ldots B_n)) \quad (135)$$

$$(<=H\$del(\text{and}\ B_1 \ldots B_i\$del \ldots B_n)) \quad (136)$$

Second, the algorithm evaluates $R^{del}$ using the techniques described herein including those described after the section titled Complete Reasoning in the DDB. Note that all rules in $R^{del}$ are linear-recursive. Furthermore, all recursive predicates are of the form P$del and are thus expected to be small. Therefore, one can expect the technique described herein after the section titled Complete Reasoning in the DDB to be reasonably efficient.

Third, for each predicate P, the algorithm removes from P all facts contained in P$del.

Fourth, the algorithm transforms the rule set R into a rule set $R^{red}$ by converting each rule of the form (135) into a rule of the form (137). $R^{red}$ computes the set of facts that were deleted in the previous step, but that can nevertheless be derived from the "surviving" facts.

$$(<=H\$ins(\text{and } H\$del\ B_1 \ldots B_n)) \quad (137)$$

Fifth, the algorithm evaluates $R^{red}$ using the technique described herein including those described after the section titled Complete Reasoning in the DDB. Since no rule in $R^{red}$ is recursive, the evaluation is efficient.

Sixth, the algorithm empties each P$del.

After these steps, the incremental insertions algorithm below is executed to transfer the facts in P$ins into P.

2.4.2. Incremental Insertions

This section describes the incremental addition step, which transfers the facts from P$ins predicates into the main extensions. For the reasons explained in the section titled Computing the SCCs, this algorithm computes the SCCs of a predicate dependency graph, and then processes each SCC independently. The rest of this section describes how to process an SCC containing the set of predicates K. The sets $R^{nr,K}$ and $R^{r,K}$ are computed as described in the section titled Processing a SCC. The algorithm then proceeds as follows.

First, for each predicate P∈K, the algorithm performs the following steps.

1. For each fact A∈F with predicate P, the fact A$ins is removed from F if it exists. Essentially, this step ensures that the extensions of P and P$ins are disjoint.
2. For each rule $r \in R^{nr,K} \cup R^{r,K}$ of the form (135) in which H has predicate P, and for each i such that the predicate of $B_i$ does not occur in K, the following rule is evaluated:

$$(<=H\$ins(\text{and } B_1 \ldots B_i\$ins \ldots B_n)) \quad (138)$$

This is performed as described in the section titled A Naïve Saturation Algorithm, but with the following change: a fact A$ins derived in this way is kept only if A$ins∉F and A∉F. This is used to maintain the disjointness of P and P$ins.
3. All facts in P$ins are copied into P.
4. If P occurs in an antecedent of some rule in $R^{r,K}$, then all facts in P$ins are copied into a temporary predicate P$delta_old, and an empty temporary predicate P$delta_new is created.

Second, for as long as at least one predicate P∈K exists such that P$delta_old is not empty, the algorithm repeats the following steps.

1. For each rule $r \in R^{r,K}$ of the form (135) and each i such that the predicate of $B_i$ occurs in K, the following rule is evaluated:

$$(<=H\$delta\_new(\text{and } B_1 \ldots B_i\$delta\_old \ldots B_n)) \quad (139)$$

This is performed as described in the section titled A Naïve Saturation Algorithm, but with the following change: a fact A$delta_new derived in this way is kept only if A$delta_new∉F and A∉F.

2. For each predicate P∈K, the following actions are performed:
   (a) All facts in P$delta_new are copied into P.
   (b) All facts in P$delta_new are copied into P$ins.
   (c) P$delta_old is emptied.
   (d) All facts in P$delta_new are copied into P$delta_old.
   (e) P$delta_new is emptied.

Third, for each predicate P∈K, P$ins is emptied.

This algorithm can be seen as a variation of the algorithm described herein in the section Complete Reasoning in the DDB. One difference between these algorithms is that the other algorithm does involve copying all facts in P into P$delta_old, which can be costly. In order to avoid that, the algorithm described in this section evaluates the recursive rules in a way which might derive the same fact several times. This, however, will not cause problems in practice since the extensions of P$ins are expected to be comparatively small.

2.5. Query Answering in the DDB

Query answering in the DDB is implemented by translating DDB queries into SQL. The DDB provides several translation modes. The basic, unoptimized translation is described below, as are the two optimized translations.

2.5.1. Basic Query Translation

This section presents an outline the basic algorithm for translating DDB queries into SQL. The algorithm accepts a DDB query Q, a mapping B of variables to SQL expressions, and a list of variables R that should be returned by the translation, and it produces an SQL query sql(Q, B, R).

In addition, the algorithm maintains a global supply of aliases for tables and subqueries. The global supply of aliases is used to form the SQL FROM clause. The algorithm is invoked with B and R empty. The translation is recursive, and each recursion level handles one possible structure of Q. The descriptions of how to handle the different structures are included below.

Query: $Q=((?X_1 \ldots ?X_m)E_1 \ldots E_n)$ sql(Q, B, R) is defined as sql(E, B', R'), where E=(and $E_1 \ldots E_n$), B' is obtained from B by removing the bindings for all variables other than $?X_1, \ldots ?X_m$, and R is $?X_1, \ldots, ?X_m$.

Atom: Q=A sql(Q, B, R) is obtained as sql(E, B, R), where E is (and A).

Negation: Q=(not E)

sql(Q, B, R) is obtained as sql(E, B, R), where E is (and (not E)).

Aggregate: Q=(aggregate s (F $s_1 \ldots s_k$)E)

sql(Q, B, R) is obtained as sql(E, B, R), where E is (and (aggregate . . . )).

Conjunction: Q=(and $E_1 \ldots E_n$)

The algorithm first copies B into B', and then it computes sql(Q, B, R) as a SELECT statement constructed as follows. For each $E_i$ not of the form (not . . . ) or (aggregate . . . ), the following steps are performed.

1. If $E_i$ is not atom, then the following steps are performed.
   (a) R' is defined as the set of free variables of $E_i$.
   (b) Q' is set to sql($E_i$, B',R').
   (c) Q' is added to the FROM clause with a fresh alias $t_i$.
   (d) For each variable $?X \in R'$ and the corresponding column $a_j$ of Q', if B[$?X_j$] is not defined, then B[$?X_j$] is set to $t_i \cdot a_j$; otherwise, condition $t_i \cdot a_j = B[?X_j]$ is added to the WHERE clause.

2. If Ei=(P $s_1 \ldots s_k$), then the following steps are performed.

(a) ddb_P is added to the FROM clause with a fresh alias $t_i$.
(b) For each argument $s_j$ of $E_i$ and the corresponding column $a_j$ of ddb_P, the following steps are performed.
  i. If $s_j$ is a constant, then condition $t_i.a_j=s_j$ is added to the WHERE clause.
  ii. If $s_j$ is a variable $?X_j$ and $B[?X_j]$ is not defined, then $B[?X_j]$ is set to $t_i.a_j$.
  iii. If $s_j$ is a variable $?X_j$ and $B[?X_j]$ is defined, then condition $t_i.a_j=B[?X_j]$ is added to the WHERE clause.

For each expression $E_i$ of the form (not . . . ), the algorithm adds condition NOT EXISTS sql(Ei,B', ∅) to the WHERE clause.

For each expression $E_i$ of the form (aggregate s (F $?X_1$ . . . $?X_n$)E), the algorithm sets G to the SQL expression F(sql(E, B', {$?X_1$, . . . $?X_n$})). If s is a constant, then condition G=s is added to the WHERE clause. If s is a variable ?Y and B[?Y] is not defined, then B[?Y] is set to E. If s is a variable ?Y and B[?Y] is defined, then $G=B[?X_j]$ is added to the WHERE clause.

Finally, for each variable $?X \in R$, the algorithm adds B[?X] to the SELECT clause.

Disjunction: Q=(or $E_1$ . . . $E_n$)
sql(Q, B, R) is defined as sql($E_1$, B, R) UNION . . . UNION sql($E_n$, B, R).

Existential Quantification: Q=(exists ($?X_1$ . . . $?X_n$) E) sql(Q, B, R) is obtained as sql(E, B', R'), where B' and R' are obtained from B and R, respectively, by removing all variables $?X_1$, . . . , $?X_n$.

2.5.2. Optimized Query Translation

The DDB provides two optimized ways of translating conjunctive expressions of the form Q=(and $E_1$ . . . $E_n$). The key concept in these translations is a notion of a tree decomposition of Q.

Formally, a tree decomposition of Q is a tree T in which each node $t \in T$ is labeled with a subset $\lambda(t)$ of {$E_1$, . . . $E_n$} while satisfying the following three conditions:
l. each $E_j$ occurs in at least one $\lambda(t)$;
m. $U_{t \in T} \lambda(t) = \{E_1, \ldots, E_n\}$; and
n. for each variable ?X, the nodes $t \in T$ such that $\lambda(t)$ contains ?X form a connected subtree of T.

Given a tree decomposition T of Q, the SQL query corresponding to Q (or, equivalently, T) can be obtained using one of the following two methods.

2.5.2.1. Translation Using EXISTS Statements

Starting with the root, each node $t \in T$ is translated into SQL recursively as follows.
1. $\lambda(t)$ is translated into a SELECT statement as described in the Conjunction: Q=(and E1 . . . En) section; let B' be the set of variable mappings produced in the translation.
2. For each child $t_i$ of t, the following steps are performed.
  (a) This translation algorithm is recursively applied to $t_i$, while propagating B' as the set of initial mappings. Let SQ be the resulting SQL query.
  (b) Condition EXISTS SQ is added to the WHERE clause of the SELECT statement.

2.5.2.2. Translation Using Nested Subqueries

Starting with the root, each node $t \in T$ is translated into SQL recursively as follows.
1. $\lambda(t)$ is translated into a SELECT statement as described in the Conjunction: Q=(and E1 . . . En) section; let B' be the set of variable mappings produced in the translation.
2. For each child $t_i$ of t, the following steps are performed.
  (a) This translation algorithm is recursively applied to $t_i$, while propagating B' as the set of initial mappings. Let SQ be the resulting SQL query.
  (b) SQ is added as a subquery to the FROM clause with a fresh alias $t_i$.
  (c) For each column $a_j$ of SQL corresponding to variable $?X_j$, if B'[$?X_j$] is not defined, then B'[$?X_j$] is set to $t_i.a_j$; otherwise, condition $t_i.a_j=B'[?X_j]$ is added to the WHERE clause.

3. Knowledge Representation Formalisms Used by the NLQC and DDB 3.1. The DOL Ontology Language The DOL ontology language allows one to express knowledge about a particular domain of interest. This knowledge is expressed as a sequence of statements called axioms, and a collection of axioms is called an ontology.

An ontology can be stored into a file in a textual formal called KIF. Knowledge is placed across several ontologies, each of which describes a certain aspect of the domain. For example, in the tourism domain, one might use an ontology to describe the available types of accommodation, and use another ontology to describe different modes of transportation. All ontologies describing a domain of interest are called an ontology set.

3.1.1. Kinds of Axioms

The axioms in an ontology can broadly be separated into two groups (TBox and ABox). TBox (from terminology box) axioms are general statements about the domain being modeled. They typically do not describe properties of particular objects; instead, they describe properties of all objects of a particular type. For example, the statement that "every hotel is a kind of an accommodation" is a typical TBox axiom. ABox (from assertional box) axioms are statements about particular objects. For example, the statement that "Savoy is a hotel" is a typical ABox axiom. ABox axioms are often synonymously called facts.

TBox axioms can be further split into two subgroups with respect to how they are used during inferencing. The first group consists of axioms that can be used to infer new facts. For example, given the fact that "Savoy is a hotel," the TBox axiom stating that "every hotel is a kind of an accommodation" can be used to derive the fact that "Savoy is a kind of accommodation." The second group consists of axioms that specify what constitutes valid data; such axioms are called integrity constraints. For example, the integrity constraint that "the set of women and men is disjoint" can be used to detect an error in an ontology containing statements that "Peter is a woman" and "Peter is a man." Some TBox axioms belong to both groups; that is, their formal meaning is part inference rule and part integrity check.

3.1.2. Predicates, Atoms and Facts

An individual is a symbol used to denote an object from the real world. For example, the individual Peter can refer to a particular person called Peter. Individuals are fundamental building blocks of axioms in the DDB language.

A variable is a symbol prefixed by a question mark, such as ?X. Variables should be understood as placeholders for individuals.

A constant is a well-known value, such as an integer or a string. Both constants and individuals represent values that can be used to make statements. However, individuals can also represent abstract objects from the domain of discourse, where constants can represent values (such as number one) and can be used in operations (such as addition).

Each constant is associated with a datatype (an abstract description of allowed constants and their properties). Constants can be written using the following form, where DT is the name of a datatype (such as STRING or INTEGER), and $tok_i$ are tokens identifying the constant; the meaning of these is defined by each datatype separately.

$$(DT\ tok_1 \ldots tok_L) \qquad (1)$$

In addition, the DOL language offers several syntactic shortcuts. For example, constants of datatype STRING can be written by enclosing a sequence of characters in double quotes, and constants of datatypes INTEGER and DOUBLE can be written as numbers without any additional qualification. Individuals can be considered to belong to a special datatype called INDIVIDUAL.

A term is an individual, a variable, a constant, or a functional term of the following form, where $t_1, \ldots, t_n$ are terms:

$$(f t_1 \ldots t_k) \qquad (2)$$

Here, $f$ is a function, and k is the arity of $f$. Functional terms represent the result of applying the function f to arguments $t_1, \ldots, t_k$. Function terms are mainly used to represent individuals whose name is not specified explicitly. For example, assume that one needs to represent information about people and their extremities. To be able to state information about Peter and his left hand, one might introduce individuals Peter and Peter's left hand. Explicitly introducing individuals such as the latter one, however, might be tedious. As a remedy, one can introduce function leftHand, which, when applied to an individual representing a person, returns a unique individual representing the left hand of that individual. Then, to refer to the left hand of Peter, one can simply write (leftHand Peter).

The basic unit of information in the DOL language is an atom, which has the following form:

$$(P t_1 \ldots t_n) \qquad (3)$$

Here, P is a predicate, and $t_1, \ldots, t_n$ are terms. The number n is called the arity of the predicate P. An atom that does not contain variables is said to be ground, and it is sometimes also called a fact.

For example, in atom (4), hasChild is a predicate, and Peter and Paul are individuals. Individuals are used to represent concrete objects from the domain to be modeled. For example, individual Peter can be used to refer to some particular person whose name is Peter. Predicates are used to represent properties of individuals. For example, the hasChild predicate is used to represent the parent-child relationship between people. Thus, atom (4) can be understood as a statement that Paul is a child of Peter.

$$(hasChild\ Peter\ Paul) \qquad (4)$$

Predicates of arity one (i.e., unary predicates) are called classes, and they are used to represent kinds of things. For example, one might use a class called Person to represent the set of all people; then, using atom (5), one can state that Peter is a person.

$$(Person\ Peter) \qquad (5)$$

Classes can also be used to represent an object's attributes. For example, the following atom states that Peter's left hand is broken.

$$(Broken(leftHand\ Peter)) \qquad (6)$$

Predicate of arity two or more are called relations. For example, the mentioned hasChild predicate has arity two (i.e., it is binary) and it represents relationships between pairs of individuals.

Facts (i.e., ground atoms), which are the most basic kind of axiom, are used to express simple statements about objects in the world. For example, one can add atoms such as (4) and (5) to an ontology to represent information about Peter and Paul. Atoms, which are not ground, are typically used as parts of complex axioms.

As an example, if C is a class and t is a term, then an assertion of the form (C t) can equivalently be written as (instance t C). Further, if P is a predicate and $t_1, \ldots, t_n$ are terms, then an assertion of the form (P $t_1$ ... $t_n$) can equivalently be written as (atom P $t_1$ ... $t_n$).

3.1.3. Temporal Facts

The DOL language supports modeling temporal knowledge (that is, knowledge that is true for a limited period of time). For example, the statement that Peter is married to Mary may not be universally true, but might be restricted to certain time intervals. To support such statements, the DOL language provides two distinct primitives. First, the DOL language provides a datatype called TIMESTAMP whose constants represent points on a continuous time line. For example, the following constant represents the time point corresponding to noon on Christmas Day of 2010 in the UTC coordinates.

$$(TIMESTAMP\ "2010\text{-}12\text{-}25\ 12\text{:}00\text{:}00Z") \qquad (7)$$

Second, the DOL language provides axioms of the form (8)-(9), where A is an atom, and t, $t_1$, and $t_2$ are terms of datatype TIMESTAMP that identify points on the time line. Axiom (8) states that A is true at time point t, whereas axiom (9) states that A is true at all time points between $t_1$ and $t_2$, end points inclusive.

$$(HOLDS\_AT\ A\ t) \qquad (8)$$

$$(HOLDS\_EVERYWHERE\ A\ t_1 t_2) \qquad (9)$$

For example, the following axiom states that Peter was married to Mary between the specified time points.

$$(HOLDS\_EVERYWHERE(marriedTo\ Peter\ Mary)$$
$$(TIMESTAMP\ "2001\text{-}05\text{-}16\ 8\text{:}50\text{:}00Z") \qquad (10)$$
$$(TIMESTAMP\ "2009\text{-}08\text{-}13\ 8\text{:}50\text{:}00Z"))$$

Complete details about the syntax and semantics of the temporal facts can be found in the section Representing and querying validity time in Ontology Languages 3.1.4. Built-In Predicates In addition to predicates such as marriedTo whose meaning is defined by the user, the DOL language provides for built-in predicates, which have a pre-defined meaning. For example, sum is a built-in predicate that can be applied to three numeric arguments. An atom of the form:

$$(sum\ t_1 t_2 t_3) \qquad (11)$$

is true if the value of $t_3$ is equal to the sum of the values of $t_1$ and $t_2$. This predicate can be used to add two numeric expressions.

3.1.5. Declarations

All non-built-in predicates used in an ontology can be declared, so as to inform about the predicates' existence. This can be done using the axioms of the following types.

$$(class\ C) \qquad (12)$$

$$(relation\ R DT_1 \ldots DT_n) \qquad (13)$$

Axiom (12) states that C is a class. Axiom (13) states that R is a relation or arity n, and that in each assertion involving R, the ith argument can be of datatype $DT_i$. Furthermore, the DOL language supports the following two types of declarations, which state that C, respectively R, are temporal predicates. This is useful if one is to use C and R in axioms of the form (8)-(9).

(class $C$ temporal) (14)

(relation $R$ temporal $DT_1 \ldots DT_n$) (15)

For example, the following axioms declare the class called Person, the relation marriedTo that is applied to pairs of individuals, and the relation height that associates an individual with an integer (with the goal of representing the height of people).

(class Person) (16)

(relation marriedTo INDIVIDUAL INDIVIDUAL) (17)

(relation height INDIVIDUAL INTEGER) (18)

Similarly, all functions that are used in functional terms using an axiom of the form as specified below can be declared.

(function $F DT_1 \ldots DT_n$) (19)

Individuals using axioms of the form as specified below can also be declared. Although individuals do not need to be declared, individual declarations can be used to detect errors in ontologies due to misspelling of an individual's name.

(individual $I$) (20)

3.1.6. Axioms Producing New Facts

This section summarizes the TBox axioms that can be used to derive facts from other facts.

3.1.6.1. Rule

Rules are the most general axioms for deriving new facts from existing ones. A rule is an expression of the form (21) or (22), where H, $B_1, \ldots, B_n$ are (not necessarily ground) atoms.

($<=H$(and $B_1 \ldots B_n$)) (21)

($<=HB_1$) (22)

If a rule does not contain variables, then the rule essentially states that H should be derived to be true if all $B_i$ are already known to be true. If a rule contains variables, then the rule can be understood as a shortcut for all variable-free rules obtained by replacing in the original rule all variables in all possible ways. Atoms $B_1, \ldots, B_n$ are called antecedent or body atoms, and atom H is called the consequent or head atom.

For example, the following rule says that a person married to someone is not single.

($<=$(NotSingle?$X$)(marriedTo?$X$?$Y$)) (23)

The semantics of all other inference axioms is defined by translating the axiom into one or more rules. Thus, all other inference axioms can be understood as syntactic shortcuts.

3.1.6.2. Subclass

An axiom of the form (24) states that class $C_1$ is a subclass of class $C_2$; that is, that all individuals that belong to $C_1$ also belong to $C_2$. The axiom is equivalent to the rule (25).

(subclass $C_1C_2$) (24)

($<=(C_1?X)(C_2?X)$) (25)

3.1.6.3. Function Range

An axiom of the form (26) states that each result of the function F belongs to the class C. The axiom is equivalent to the rule (27).

(functionRange $FC$) (26)

($<=(C(F?X_1 \ldots ?X_n))$) (27)

3.1.6.4. Subrelation

An axiom of the form (28) states that relation $R_1$ is a subrelation of relation $R_2$. In other words, each tuple of terms $t_1, \ldots, t_n$ belonging to $R_1$ also belongs to $R_2$. The axiom is equivalent to the rule (29).

(subrelation $R_1R_2$) (28)

($<=(R_2?X_1 \ldots ?X_n)(R_1?X_1 \ldots ?X_n)$) (29)

3.1.6.5. Inverse Relation

An axiom of the form (30) states that binary relation $R_1$ is the inverse of binary relation $R_2$. The axiom is equivalent to the rules (31) and (32).

(inverseRelations $R_1R_2$) (30)

($<=(R_2?Y?X)(R_1?X?Y)$) (31)

($<=(R_2?X?Y)(R_1?Y?X)$) (32)

3.1.6.6. Subfiller

An axiom of the form (33) states that if individual $I_1$ is a filler for some individual ?X in a binary relation R, then individual $I_2$ is a filler for ?X in R as well. The axiom is to the rule (34).

(subfiller $R$ $I_1I_2$) (33)

($<=(R$ $I_2?X)(R$ $I_1?X)$) (34)

3.1.6.7. Symmetric Relation

An axiom of the form (35) states that binary relation R is symmetric. The axiom is equivalent to the rule (35).

(symmetricRelation $R$) (35)

($<=(R?Y?X)(R?X?Y)$) (36)

3.1.6.8. Transitive Relation

An axiom of the form (37) states that binary relation R is transitive. The axiom is equivalent to the rule (37).

(transitiveRelation $R$) (37)

($<=(R?X?Z)(and(R?X?Y)(R?Y?Z))$) (38)

3.1.7. Integrity Constraints

This section summarizes the DOL language axioms that are interpreted as integrity constraints. The semantics of each axiom can be expressed using a DQL query. If the integrity constraints are satisfied, then the corresponding queries do not return any results. Otherwise, the query results identify the individuals and constants in the ontology that violate the integrity constraint.

3.1.7.1. Relation Domain

An axiom of the form (39) states that the argument i of relation R must belong to class C. The axiom corresponds to the query (40).

(relationDomain $RiC$) (39)

(($?X_1 \ldots ?X_n(R?X_1 \ldots ?X_n)(not(C?X_i))$)) (40)

3.1.7.2. Disjoint Fillers

An axiom of the form (41) states that, in a binary relation R, no individual ?X is allowed to have individuals $I_i$ and $I_j$ as fillers (provided that $i \neq j$). The axiom is equivalent to queries of the form (42).

(disjointFillers $R$ $I_1 \ldots I_n$) (41)

(($?X)(R?X$ $I_i)(R?X$ $I_j)$) for $1 \leq i < j \leq n$ (42)

3.1.7.3. Irreflexive Relation

An axiom of the form (43) states that the binary relation R is irreflexive. The axiom is equivalent to the query (44).

$$(\text{irreflexiveRelation } R) \tag{43}$$

$$((?X)(R?X?X)) \tag{44}$$

3.1.7.4. Asymmetric Relation

An axiom of the form (45) states that the binary relation R is asymmetric. The axiom is equivalent to the query (46).

$$(\text{asymmetricRelation } R) \tag{45}$$

$$((?X?Y)(R?X?Y)(R?Y?X)) \tag{46}$$

3.1.7.5. Antisymmetric Relation

An axiom of the form (47) states that the binary relation R is antisymmetric. The axiom is equivalent to the query (48).

$$(\text{antisymmetricRelation } R) \tag{47}$$

$$((?X?Y)(R?X?Y)(R?Y?X)(\text{differentFrom }?X?Y)) \tag{48}$$

3.1.7.6. Intransitive Relation

An axiom of the form (49) states that the binary relation R is not transitive. The axiom is equivalent to the query (50).

$$(\text{intransitiveRelation } R) \tag{49}$$

$$((?X?Y?Z)(R?X?Y)(R?Y?Z)(R?X?Z)) \tag{50}$$

3.1.7.7. Single Valued Relation

An axiom of the form (51) states that the last argument in each tuple in relation R must be unique. The axiom is equivalent to the query (52).

$$(\text{singleValuedRelation } R) \tag{51}$$

$$((?X_1 \ldots ?X_{n-1}?X_n?Y_n)(R?X_1 \ldots ?X_{n-1}?X_n)$$
$$(R?X_1 \ldots ?X_{n-1}?Y_n)(\text{differentFrom } X_n Y_n)) \tag{52}$$

3.1.7.8. General Integrity Constraints

A general integrity constraint is an axiom of the form (53) or (54), where $B_1, \ldots, B_n$ and $H_1, \ldots, H_m$ are atoms. The constraint says that, whenever $B_1, \ldots, B_n$ are all true, then $H_1, \ldots, H_m$ must all be true as well. The axiom is equivalent to the query (55), where $?X_1, \ldots, ?X_k$ are the variables that occur in $B_1, \ldots, B_n$, and $?Y_1, \ldots, ?Y_L$ are the variables that occur in $H_1, \ldots, H_m$ but not in $B_1, \ldots, B_n$.

```
(IC (<=
        (exists (?Y₁...?Y_L) (and H₁...H_m))
        (and B₁...B_n)
))
(IC (<= H₁ (and B₁...B_n))
((?X₁...?X_k)
    H₁...H_m
    (not (exists (?Y₁...?Y_L) (and H₁...H_m)))
)
```

3.1.8. Mixed Axioms

Some DDB axioms can have dual functions. For example, they can infer new facts and are interpreted as integrity constraints. Such axioms are listed in this section.

3.1.8.1. Exhaustive Individual Cover

An axiom of the form (56) states that a class C contains precisely the individuals $I_1, \ldots, I_n$. The axiom corresponds to n rules of the form (57) and one query of the form (58).

$$(\text{exhaustiveIndividualCover } C\ I_1 \ldots I_n) \tag{56}$$

$$(<=(C\ I_i)) \text{ for } 1 \leq i \leq n \tag{57}$$

$$((?X)(C?X)$$
$$(\text{differentFrom }?X\ I_1) \ldots (\text{differentFrom }?X\ I_n)) \tag{58}$$

3.1.8.2. Class Partition

An axiom of the form (59) states that each individual belonging to a class C also belongs to one of the disjoint classes $C_1, \ldots, C_n$, and vice versa. The axiom corresponds to n rules of the form (60), one query of the form (61), and queries of the form (62).

$$(\text{classPartition } C\ C_1 \ldots C_n) \tag{59}$$

$$(<=(C?X)(C_i?X)) \text{ for } 1 \leq i \leq n \tag{60}$$

$$((?X)(C?X)(\text{not}(C_1?X)) \ldots (\text{not}(C_n?X))) \tag{61}$$

$$((?X)(C_i?X)(C_j?X)) \text{ for } 1 \leq i < j \leq n \tag{62}$$

3.1.8.3. Exhaustive Class Decomposition

An axiom of the form (63) is similar to a class partition axiom of the form (59), but without the requirement that all classes $C_1, \ldots, C_n$, are disjoint. The axiom corresponds to n rules of the form (60) and the query (61).

$$(\text{exhaustiveClassDecomposition } C\ C_1 \ldots C_n) \tag{63}$$

3.1.8.4. Disjoint Class Decomposition

An axiom of the form (64) is similar to a class partition axiom of the form (59), but without the "vice versa" part. The axiom is equivalent to n rules of the form (60) and queries of the form (62).

$$(\text{disjointClassDecomposition } C\ C_1 \ldots C_n) \tag{64}$$

3.1.9. Directives

The DDB language also provides several directives. These are axioms that do not affect the set of consequences of an ontology, but that merely govern the inferencing process.

3.1.9.1. Nonmaterializable Predicate

An axiom of the form (65) states that facts involving the predicate P should not be explicitly stored during reasoning, but should be recomputed during querying. This can be useful if the reasoning process would derive many facts involving P.

$$(\text{nonmaterializable } P) \tag{65}$$

3.1.9.2. Precomputed Join

An axiom of the form (66), where $B_1, \ldots, B_m$ are atoms, instructs the DDB to evaluate a query $((?X_1 \ldots ?X_n) B_1 \ldots B_m)$ and store its result during reasoning. Each query that contains $B_1 \ldots B_m$ as a sub-query is then evaluated without re-computing the result of the sub-query. This feature can therefore be seen as a form of caching.

$$(\text{precomputedJoin}(?X_1 \ldots ?X_n) B_1 \ldots B_m) \tag{66}$$

3.2. The DQL Query Language

The DQL is an expressive language for formulating logic queries. This language is compositional, in the sense that the output of one query can be fed as input to another query. A DQL query Q has the general form shown in (67).

$$((?X_1 \ldots ?X_n) E_1 \ldots E_m) \tag{67}$$

Variables $?X_1, \ldots ?X_n$ are said to be distinguished, and they determine the answer to the query. Each answer to Q can provide a single value for each variable $?X_i$. The query can consist of expressions $E_1, \ldots, E_m$.

The basic expressions are atoms. For example, the following query retrieves the first name of each person whose last name is Smith.

$$((?FN)(\text{Person }?P)(\text{firstName }?P?FN)(\text{lastName }?P?LN)) \tag{68}$$

If desired, by including the keyword distinct after the variable list, the DDB can ensure that each answer occurs in a result set only once. Furthermore, one can specify a list of variables that should be used for sorting. For example, the following query ensures that each name is returned only once, and the names are sorted in the ascending sequence.

$$((?FN) \text{distinct order}(?FN)) \quad (69)$$

$$(\text{Person } ?P)(\text{firstName } ?P?FN)(\text{lastName } ?P?LN))$$

Queries can themselves occur as expressions in other queries. The rest of this section describes different kinds of expressions one can use to construct complex queries. Some expressions may require a term t to be bound elsewhere, which means that if t is a variable, then t must occur in a query in an expression that does not impose such a condition.

3.2.1. Temporal Expressions

Temporal expressions can be used to identify time points at which a certain fact holds. In the rest of this section, A denotes an atom of the form (P s1 . . . sn) with P a temporal predicate (i.e., a class or a relation).

An expression of the form (70) is true if atom A is true at time instant represented by t. The term t must be bound elsewhere.

$$(\text{HOLDS AT } A \ t) \quad (70)$$

An expression of the form (71) is true if atom A is true at all time instants between $t_1$ and $t_2$ (inclusive). Terms $t_1$ and $t_2$ must be bound elsewhere.

$$(\text{HOLDS EVERYWHERE } A \ t_1 t_2) \quad (71)$$

An expression of the form (72) is true if atom A is true in at least one time instant between $t_1$ and $t_2$ (inclusive). Terms $t_1$ and $t_2$ must be bound elsewhere.

$$(\text{HOLDS SOMEWHERE } A \ t_1 t_2) \quad (72)$$

An expression of the form (73) is true if atom A is true at all time instants between $t_1$ and $t_2$ (inclusive), and A is not true immediately before $t_1$ and immediately after $t_2$. Terms $t_i$ and $t_2$ need not be bound elsewhere.

$$(\text{MAX INTERVAL } A \ t_1 t_2) \quad (73)$$

An expression of the form (74) is true if atom A is true at t but not at all time instants prior to it. Term t need not be bound elsewhere.

$$(\text{START TIME } A \ t) \quad (74)$$

An expression of the form (75) is true if atom A is true at t but not at all time instants after it. Term t need not be bound elsewhere.

$$(\text{END TIME } A \ t) \quad (75)$$

Complete details about the syntax and semantics of the temporal expressions can be found in the section Representing and Querying Validity Time in Ontology Languages.

3.2.2. Logical Expressions

In the rest of this section, E, $E_1$, . . . , $E_n$ denote other (simpler) expressions. The truth of all such expressions is defined inductively, that is by evaluating the expressions inside-out. An expression of the form (76) is true if and only if $E_1$, . . . , $E_n$ are all simultaneously true.

$$(\text{and } E_1 \ldots E_n) \quad (76)$$

An expression of the form (77) is true if and only if at least one of $E_1, \ldots, E_n$ is true. All expressions must have the same free variables.

$$(\text{or } E_1 \ldots E_n) \quad (77)$$

An expression of the form (78) is true if and only if E is not true. All free variables occurring in E must be bound elsewhere.

$$(\text{not } Q) \quad (78)$$

An expression of the form (79) is true if and only if E is true for some value of variables $?X_1, \ldots, ?X_n$.

$$(\text{exists}(?X_1 \ldots ?X_n)E) \quad (79)$$

An expression of the form (80) returns all answers that make $E_1$ true, extended whenever possible such that $E_2$ is true as well.

$$(\text{optional } E_1 E_2) \quad (80)$$

An expression of the form (81) returns all values of Y that are obtained by evaluating expression E and then applying aggregate function F to arguments $?X_1, \ldots, ?X_n$. An expression of the form (82) does the same, with the difference that the duplicates among $?X_1, \ldots, ?X_n$ are eliminated first.

$$(\text{aggregate } ?Y(F?X_1 \ldots ?X_n)E) \quad (81)$$

$$(\text{aggregate } ?Y(F \text{ distinct } ?X_1 \ldots ?X_n)E) \quad (82)$$

3.3. Representing and Querying Validity Time in Ontology Languages

State-of-the-art ontology languages like Resource Description Framework (RDF) and Web Ontology Language 2 (OWL 2) only support static ontologies. These static ontologies represent a set of true facts that does not change with time. In practice, however, the truth of facts often changes with time, and applications often need to represent and perform reasoning about such changes.

This section includes the syntax and semantics for supporting validity time in ontology languages, which will enable the representation of temporal ontologies, the reasoning over temporal ontologies and the query answering over temporal ontologies. The syntax and semantics for adding validity time to ontology languages are described using the RDF, OWL 2 DL and SPARQL syntax and semantics, which are unambiguous and well understood, although the invention applies to any ontology language based on first-order logic, such as DOL/DQL, F-Logic, Rule Interchange Format (RIF), Open Knowledge Base Connectivity (OKBC) or Knowledge Interchange Format (KIF), among others. Therefore, the invention is not restricted to a particular ontology or query language, and enables the extension of static ontology languages and static query languages to temporal ontology languages and temporal query languages.

Additionally, this section includes the algorithms needed to reason over temporal ontologies, and the algorithms to answer (temporal) queries over temporal ontologies.

Additionally, this section includes the description of a system that is capable of storing temporal ontologies, reasoning over temporal ontologies and answering (temporal) queries over temporal ontologies, using the approach described in this section.

In an embodiment, the DOL language is extended to support the representation of temporal facts, according to the section Temporal Facts described above.

In another embodiment, the DDB is extended to support storage of temporal facts, reasoning over temporal facts and predicates and query answering over temporal facts and predicates, according to the section The Deductive Database described above.

In yet another embodiment, the DQL language is extended to support temporal expressions in queries, according to the section Temporal Expressions described above.

3.3.1. Representing and Querying Validity Time in RDF, Owl and SPARQL 3.3.1.1. Preliminaries The syntax of RDF [G. Klyne, J. J. Carroll, Resource Description Framework (RDF): Concepts and Abstract Syntax, http://www.w3.org/TR/rdf-concepts/(Feb. 10, 2004)] is defined with respect to infinite sets U, B, and L of URI references, blank nodes, and literals, respectively. Let UBL=U∪B∪L. An RDF triple (usually abbreviated to just triple) is an assertion of the form (s, p, o) with s, p, o∈UBL (RDF actually requires s∈U∪B, p∈U, and o∈UBL, but this is not important for the purposes of this section, so we assume s, p, o∈UBL for the sake of simplicity). An RDF graph (or just graph) G is a finite set of triples. The semantics of RDF is determined by entailment relations.

Simple entailment, RDF entailment, RDFS entailment, and D-entailment are defined in [Hayes, P., RDF Semantics, W3C Recommendation (Feb. 10, 2004), http://www.w3.org/TR/rdf-mt/], OWL 2 RDF-Based entailment is defined in [Motik, B., et al., OWL 2 Web Ontology Language: Profiles, W3C Recommendation (Oct. 27, 2009), http://www.w3.org/TR/owl2-profiles/], and OWL 2 RDF-Based entailment is defined in [Schneider, B., OWL 2 Web Ontology Language: RDF-Based Semantics, W3C Recommendation (Oct. 27, 2009), http://www.w3.org/TR/owl-rdf-based-semantics/]. The logical consequences of each entailment relation X from this list can be characterized by a (possibly infinite) set of first-order implications $\Gamma_x$. For example, for RDF and entailment, $\Gamma_{RDF}$ contains the rules in [Hayes, P., RDF Semantics, W3C Recommendation (Feb. 10, 2004), http://www.w3.org/TR/rdf-mt/, Section 7], and for OWL 2 RL/RDF entailment, $\Gamma_{RL}$ contains the rules in [Motik, B., Cuenca Grau, B., Horrocks, I., Wu, Z., Fokoue, A., Lutz, C.: OWL 2 Web Ontology Language Profiles, W3C Recommendation (Oct. 27, 2009), Section 4.3].

The semantics of a graph G with respect to X can be defined by transforming G into a first-order theory as follows. Each blank node corresponds to a first-order variable (i.e., for simplicity, blank nodes are not distinguishable from variables). Let $b_x(G)$ be the set of all blank nodes in G. For a triple A=(s, p, o); let $\pi_x(A)$=T(s, p, o), where T is a ternary first-order predicate. For a graph G, let $\pi_x(G)$=A∈G ∧ $\pi_x(A)$. The first-order theory corresponding to G is then $v_x(G)$={∃$b_x(G)$: $\pi_x(G)$}∪$\Gamma_x$. Let $\xi_x(G)$ be obtained from $v_x(G)$ by skolemizing the existential quantifiers in ∃$b_x(G)$, that is, by removing ∃$b_x(G)$ and replacing each blank node in $\pi_x(G)$ with a fresh URI reference. Theory $v_x(G)$ is equisatisfiable with $\xi_x(G)$.

A graph $G_1$ X-entails a graph $G_2$, written $G_1|=_x G_2$, if and only if $v_x(G_1)|=∃b_x(G_2)$: $\pi_x(G_2)$; the latter is the case if and only if $\xi_x(G_1)|=∃b_x(G_2)$: $\pi_x(G_2)$.

As used herein, OWL 2 DL-entailment is defined as follows. A graph G encodes an OWL 2 DL ontology if G can be transformed into an OWL 2 DL ontology O(G) as specified in [Patel-Schneider, P. F., B, M., OWL 2 Web Ontology Language: Mapping to RDF Graphs, W3C Recommendation (Oct. 27, 2009), http://www.w3.org/TR/owl2-mapping-to-rdf/]. For such G, let $b_{DL}(G)$ be the set of blank nodes in O(G); let $\pi_{DL}(G)$=θ(O(G)); let $v_{DL}(G)$=∃$b_{DL}(G)$: θ(O(G)); and let $\xi_{DL}(G)$ be obtained from $v_{DL}(G)$ by skolemizing the existential quantifiers in ∃$b_{DL}(G)$. Formula $v_{DL}(G)$ is equisatisfiable with $\xi_{DL}(G)$. For $G_1$ and $G_2$ graphs that encode OWL 2 DL ontologies, $G_1$ DL-entails $G_2$, written $G_1|=_{DL}G_2$, if and only if $v_{DL}(G_1)|=∃b_{DL}(G_2)$: $\pi_{DL}(G_2)$; the latter is the case if and only if $\xi_{DL}(G_1)|=∃b_{DL}(G_2)$: $\pi_{DL}(G_2)$.

SPARQL is the standard W3C language for querying RDF graphs, and the 1.1 version (under development as of May 2011) will support different entailment relations. In this paper we focus on group patterns, the core of SPARQL that deals with pattern matching and is largely independent from constructs such as aggregates and sorting. We formalize group patterns as in [J. Perez, M. Arenas, C. Gutierrez, Semantics and complexity of SPARQL, ACM Transactions on Database Systems 34 (3).], and we treat answers as sets rather than multisets as this simplifies the presentation without changing the nature of our results.

Let V be an infinite set of variables disjoint from UBL. A mapping is a partial function μ: V→UBL. The domain, respectively range, of μ is denoted with dom(μ), respectively rng(μ), and we define μ(t)=t for t∈UBL∪V\dom(μ). Mappings $\mu_1$ and $\mu_2$ are compatible if $\mu_1(x)=\mu_2(x)$ for each x∈dom($\mu_1$)∩dom($\mu_2$); in such a case, $\mu_1 \cup \mu_2$ is also a mapping. The following algebraic operations on sets of mappings $\Omega_1$ and $\Omega_2$ are used to define the semantics of group patterns.

$$\Omega_1 \bowtie \Omega_2 = \{\mu_1 \cup \mu_2 | \mu_1 \in \Omega_1, \mu_2 \in \Omega_2, \text{ and } \mu_1 \text{ and } \mu_2 \text{ are compatible}\}$$

$$\Omega_1 \setminus \Omega_2 = \{\mu_1 \in \Omega_1 | \text{each } \mu_2 \in \Omega_2 \text{ is not compatible with } \mu_1\}$$

A built-in expression is constructed using the elements of V∪U∪L as specified in [J. Perez, M. Arenas, C. Gutierrez, Semantics and complexity of SPARQL, ACM Transactions on Database Systems 34 (3).]; furthermore, for each built-in expression R and each mapping μ, we can determine whether R evaluates to true under μ, written μ|=R, as specified in [J. Perez, M. Arenas, C. Gutierrez, Semantics and complexity of SPARQL, ACM Transactions on Database Systems 34 (3).].

A basic graph pattern (BGP) is a set of triples of the form {s, p, o} where s, p, o∈UBL∪V.

A group pattern (GP) is an expression of the form B, $P_1$ and $P_2$, $P_1$ union $P_2$, $P_1$ opt $P_2$, or $P_1$ filter R, where B is a BGP, $P_1$ and $P_2$ are group patterns, and R is a built-in expression.

For A, a built-in expression or a group pattern and μ, a mapping, var(A) is the set of variables occurring in A, and μ(A) is the result of replacing each variable x in A with μ(x).

The answer to a group pattern P on a graph G depends on an entailment relation X. For each X, we assume that a function exists that maps each graph G to the set $ad_x(G) \subseteq$ UBL called the answer domain of G. This set determines the elements of UBL that can occur in answers to group patterns on G under X-entailment. To see why this is needed, let B={(x, rdf:type, rdf:Property)}; due to the axiomatic triples [Hayes, P., RDF Semantics, W3C Recommendation (Feb. 10, 2004), http://www.w3.org/TR/rdf-mt/], ∅|=$_{RDF}$μ(B) whenever μ(x)∈{rdf:_1, rdf:_2, . . . }. Thus, without any restrictions, the answer to B under RDF entailment would be infinite even in the empty graph. To prevent this, $ad_{RDF}(G)$ does not contain rdf:_1, rdf:_2, . . . , which makes $ad_{RDF}(G)$ finite and thus ensures finiteness of answers. Similar definitions are used with other entailment relations.

SPARQL treats blank nodes as objects with distinct identity. To understand this, let G={(a, b, c), (d, e, _:1)} where _:1 is a blank node, let P=(a,b,x), and let μ={x↦_:1}. Even though G|=$_{RDF}$μ(P), the answer to P on G under RDF entailment does not contain μ. Roughly speaking, _:1 is distinct from c even though _:1 is semantically a "placeholder" for an arbitrary URI reference. We capture this idea using skolemization: we replace the blank nodes in G with fresh URI references, thus giving each blank node a unique identity. Our answers are isomorphic to the answers of the official SPARQL specification, so skolemization allows us to simplify the technical presentation without losing generality. We formalize this idea by evaluating group patterns in $\xi_x(G)$ instead of $v_x(G)$. The table below defines the answer $[[P]]_G^X$ to a group pattern P in a graph G with regard to X.

TABLE

Semantics of Group Patterns $[[B]]_G^X = \{\mu \mid \text{dom}(\mu) = \text{var}(B), \text{rng}(\mu) \subseteq \text{ad}_x(G),$
and $\xi_x(G) \models \exists b_x(\mu(B)): \pi_x(\mu(B))\}$
$[[P_1 \text{ and } P_2]]_G^X = [[P_1]]_G^X \bowtie [[P_2]]_G^X$
$[[P_1 \text{ union } P_2]]_G^X = [[P_1]]_G^X \cup [[P_2]]_G^X$
$[[P_1 \text{ opt } P_2]]_G^X = [[P_1]]_G^X \bowtie [[P_2]]_G^X \cup [[P_1]]_G^X \setminus [[P_2]]_G^X$
$[[P_1 \text{ filter } R]]_G^X = \{\mu \in [[P_1]]_G^X \mid \mu \models R\}$ 3.3.1.2. Representing Validity Time in RDF and OWL It is straightforward to equip a triple with a time instant specifying the time point at which the triple is true; however, it would be impractical or even impossible to explicitly list all such time instants. Chomicki [Chomicki, J., Temporal Query Languages: A Survey. In: Proc. ICTL. pp. 506-534 (1994)] therefore distinguishes an abstract temporal database from a concrete temporal database. The former is a sequence of "static" databases each of which contains the facts true at some time instant. Since the time line is unbounded, an abstract temporal database is infinite, so a concrete temporal database is used as a finite specification of one or more abstract temporal databases. In this section such an approach is applied to RDF and OWL.

A discrete notion of time is used, since the predecessor/successor relation for a time-instant is needed. More precisely, the set $\mathcal{TI}$ of time instants is the set of all integers, ≤ is the usual total order on $\mathcal{TI}$, and +1 and −1 are the usual successor and predecessor functions on $\mathcal{TI}$. The set of time constants is $\mathcal{TC} = \mathcal{TI} \cup \{-\infty, +\infty\}$; we assume that $\mathcal{UBL} \cap \mathcal{TC} = \emptyset$.

Time constants −∞ and +∞ differ from time instants in that they can occur in first-order formulae only in atoms of the form −∞≤t, −∞≤+∞, and t≤+∞, where t is a time instant or variable; all such atoms are syntactic shortcuts for true. This allows us to simplify the notation for bounded and unbounded time intervals; for example, to say that $t_1 \leq x^t \leq t_2$ has no lower bound, we write $t_1 = -\infty$, which makes the expression equivalent to $x^t \leq t_2$.

Definition 1. A temporal triple has the form (s, p, o)[t] or (s, p, o) $[t_1, t_2]$, where: s, p, o∈UBL, t∈$\mathcal{TI}$, $t_1 \in \mathcal{TI} \cup \{-\infty\}$, and $t_2 \in \mathcal{TI} \cup \{-\infty\}$. A temporal graph G is a finite set of temporal triples.

Temporal graphs are interpreted in multi-sorted first-order logic. Let t be a temporal sort that is distinct from all other sorts that might be in use and that is interpreted over $\mathcal{TI}$, we write $x^t$ to stress that a variable x is of sort t (i.e., that, x ranges over $\mathcal{TI}$). Given an n-ary predicate P, let $\hat{P}$ be the n+1-ary predicate in which positions 1 to n are of the same sort as in P, but position n+1 is of sort t. For t a term of sort t and $P(u_1, \ldots u_n)$ an atom, let $P(u_1, \ldots, u_n)(t) = \hat{P}(u_1, \ldots, u_n, t)$; furthermore, for φ a first-order formula, let φ(t) be the result of replacing each atom A in φ with A(t).

Intuitively, an atom of the form $\hat{P}(u_1, \ldots, u_n, t)$ encodes the truth of the atom $P(u_1, \ldots u_n)$ at time instant t: the former atom is true if and only if the latter atom is true at time instant t. Similarly, φ(t) determines the truth of φ at time instant t.

$\approx$ is an ordinary predicate with an explicit axiomatization, so $\approx$ is well defined and it provides a notion of equality that changes with time.

Finally, to understand why a multi-sorted interpretation is needed, consider a graph G that encodes the OWL 2 DL axiom $\top \sqsubseteq \{c\}$. Such G is satisfiable only in first-order interpretations consisting; of a single object, which contradicts the requirement that a domain should contain $\mathcal{TI}$. By using multi-sorted first-order logic, we can cleanly separate temporal instants from the rest of the interpretation domain. Axioms such as $\top \sqsubseteq \{c\}$ then do not quantify over temporal instants, which solves the mentioned problem. Next, the semantics of temporal graphs are defined.

Definition 2. Let X be an entailment relation from the Preliminaries section above other than DL, and let Γx be the first-order theory that characterizes X. For G a temporal graph, $u_x(G)$, $b_x(G)$, and $tc_x(G)$ are the, subsets of U∪L, B, and TC, respectively, that occur in G. Mappings $\pi_x$ and $v_x$ are extended to temporal graphs as shown below, where O is a fresh unary predicate. Furthermore, $\xi x(G)$ is obtained from $v_x(G)$ by skolemizing the existential quantifiers $\exists b_x(G)$, and $ub_x(G)$ is $u_x(G)$ extended with the URI references introduced via skolemization.

$\pi_x((s, p, o)[t]) = \hat{T}(s, p, o, t)$ $\pi_x((s, p, o)[t_1, t_2]) = \forall x^t: (t_1 \leq x^t \leq t_2) \rightarrow \hat{T}(s, p, o, x^t)$ $\pi_x(G) = \bigwedge_{u \in b_x(G)} O(u) \wedge \bigwedge_{A \in G} \pi_x(A)$ $v_x(G) = \left\{\exists b_x(G): \bigwedge_{u \in u_x(G)} O(u) \wedge \pi_x(G)\right\} \cup \{\forall x^t: \varphi(x^t) \mid \varphi \in \Gamma x\}$ A temporal graph $G_1$ entails a temporal graph $G_2$ under entailment relation X, written $G_1 \models_x G_2$, if and only if $v_x(G_1) \models \exists b_x(G_2): \pi_x(G_2)$.

Intuitively, predicate O in $v_x(G)$ "contains" all elements of $u_x(G) \cup b_x(G)$ that occur in G, which ensures that, whenever $G_1 \models_x G_2$, all blank nodes in $G_2$ can be mapped to $u_x(G_1) \cup b_x(G_1)$.

OWL 2 DL-entailment is not characterized by a fixed set of first-order implications, so we define temporal OWL 2 DL entailment separately.

Definition 3. A temporal OWL 2 DL axiom has the form α[t] or α[$t_1, t_2$] for α an OWL 2 DL axiom, t∈$\mathcal{TI}$, $t_1 \in \mathcal{TI} \cup \{-\infty\}$, and $t_2 \in \mathcal{TI} \cup \{+\infty\}$. A temporal OWL 2 DL ontology $\mathcal{O}$ is a finite set of temporal OWL 2 DL axioms. Temporal axioms and ontologies are mapped into formulae as $\theta(\alpha[t]) = \theta(\alpha)(t)$, $\theta(\alpha[t_1, t_2]) = \forall x^t(t_1 \leq x^t \leq t_2) \rightarrow \theta(\alpha)(x^t)$, and $\theta(\mathcal{O}) = \bigwedge_{A \in \mathcal{O}} \theta(A)$. A temporal graph G encodes a temporal OWL 2 DL ontology $\mathcal{O}(G)$ if $\mathcal{O}(G)$ can be extracted from G using the mapping from [Patel-Schneider, P. F., B, M., OWL 2 Web Ontology Language: Mapping to RDF Graphs, W3C Recommendation (Oct. 27, 2009), http://www.w3.org/TR/owl2-mapping-to-rdf/] modified as follows:

Each (s, p, o) in Tables 3-8 and 10-15 is replaced with (s, p, o)[−∞, +∞].

Each triple pattern from Tables 16 and 17 without a main triple [Please refer to [Patel-Schneider, P. F., B, M., OWL 2 Web Ontology Language: Mapping to RDF Graphs, W3C Recommendation (Oct. 27, 2009), http://www.w3.org/TR/owl2-mapping-to-rdf/] for the definition of a main triple] producing an axiom α is changed as follows: each (s, p, o) in the pattern is replaced with (s, p, o)[−∞, +∞], and the triple pattern produces α[−∞, +∞].

Each triple pattern from Tables 16 and 17 with a main triple ($s_m$, $p_m$, $o_m$) producing an axiom α is replaced with the following two triple patterns.

The first one is obtained by replacing each triple (s, p, o) in the pattern other than the main one, with (s, p, o)[−∞, +∞] replacing the main triple with ($s_m$, $p_m$, $o_m$)[t], and making the triple pattern produce α[t].

The second one is obtained by replacing each triple (s, p, o) in the pattern other than the main one with (s, p, o)[−∞, +∞], replacing the main triple with ($s_m$, $p_m$, $o_m$)[t1, t2], and making the triple pattern produce α[t1, t2].

For a temporal graph G that encodes a temporal OWL 2 ontology $\mathcal{O}$ (G), $u_{DL}$(G), $b_{DL}$(G), and $tc_{DL}$(G) are the sets of named individuals, blank nodes, and temporal constants, respectively, occurring in $\mathcal{O}$ (G). Mappings, $\pi_{DL}$ and $v_{DL}$ are extended to G as shown below, where O is a fresh unary predicate. Furthermore, $\xi_{DL}$(G) is obtained from $v_{DL}$(G) by skolemizing the existential quantifiers in $\exists b_{DL}$(G), and $ub_{DL}$(G) is $u_{DL}$(G) extended with the, named individuals introduced via skolemization.

$$\pi_{DL}(G) = \bigwedge_{u \in b_{DL}(G)} O(u) \wedge \theta(O(G))$$

$$v_{DL}(G) = \exists b_{DL}(G): \bigwedge_{u \in u_{DL}(G)} O(u) \wedge \pi_{DL}(G)$$

For $G_1$ and $G_2$ temporal graphs that encode temporal OWL 2 DL ontologies, we have $G_1 \models_{DL} G_2$ if and only if $v_{DL}(G_1) \models \exists b_{DL}(G_2): \pi_{DL}(G_2)$.

Definition 3 allows us to associate validity time with axioms, but not with parts of axioms (such as class expressions). This is consistent with the view that validity time can be associated with any statement that can be true or false. This provides us with a very flexible ontology language which allows us to model, for example, class hierarchies that change over time.

Finally, we explain the intuition behind the predicate O in Definitions 2 and 3. Note that $\exists b_X(G)$ occurs in $v_X$ before the universal quantifiers over $\mathcal{T}$, so blank nodes in G are interpreted rigidly, that is, they represent the same objects throughout all time. For example, let $G_2$={(s, p, _:1)[−∞,+∞]}, so $\pi_{DL}(G_2)=\exists \_:1: O(\_:1) \wedge \forall x^t: \hat{p}(s, \_:1, x^t)$; since $\exists \_:1$ precedes $\forall x^t$, blank node _:1 refers to the same object at all time instants. In contrast, existential quantifiers in φ($x^t$) and θ($\mathcal{O}$ (G)) are not rigid, that is, they can be satisfied by different objects at different time instants. For example, let $G_3$ be a temporal graph such that $\mathcal{O}$ ($G_3$)= {$\exists p \cdot T(s)[−∞, +∞]$}, so $\pi_{DL}(G_3) = \forall x^t: \exists y: \hat{p}(s, y, x^t)$; since $\exists y$ succeeds $\forall x^t$, the value for y can be different at different time instants. Consequently, $G_2$ is not DL-equivalent to $G_3$; in fact, $G_2$ DL-entails $G_3$, but not the other way around. Blank nodes can thus be understood as unnamed constants, which is in the spirit of RDF and OWL. In line with such an interpretation, conjuncts $\bigwedge_{u \in bx(G)} O(u)$ and $\bigwedge_{u \in ux(G)} O(u)$ in Definitions 2 and 3 ensure that, if $G_2 \models_X G_3$, then the blank nodes in $b_X(G_3)$ can be mapped to the rigid objects in $u_X(G_2)$, but not to the nonrigid objects whose existence is implied by existential quantifiers. Without this restriction, $G_3$ would DL-entail $G_4$={(s,p, _:1;)[1,1]} (since the triple in $G_4$ refers only to a single time instant, the nonrigidity of $\exists p \cdot T$ is not relevant), which seems at odds with the fact that $G_3$ does not DL-entail $G_2$. Under the semantics presented, $G_3$ does not DL-entail $G_4$ due to the O predicate, which is more intuitive and is easier to implement.

3.3.1.3. Querying Temporal Graphs

The first step in designing a query language is to identify the types of questions that, the language should support. The language of first-order logic readily reveals the following natural types of questions needed to query temporal graphs:

Q1. Does BGP B hold in G at some time instant t?

Q2. Does BGP B hold in G at all time instants between $t_1$ and $t_2$?

Q3. Does BGP B hold in G at some time instant between $t_1$ and $t_2$?

Such questions can be encoded using first-order formulae, and an answer to a formula Q over a graph G under entailment relation X is defined as the set of mappings μ of the free variables of Q such that $G \models_X \mu(Q)$.

This approach, however, has an important drawback. Consider the temporal graph $G_5$={(a, b, c)[5,12], (a, b, c)[9, +∞]} and the formula $Q(x_1, x_2) = \forall x: x_1 \leq x \leq x_2 \rightarrow (a, b, c)[x]$ that represents a question of type Q2. Evaluating $Q(x_1, x_2)$ on $G_5$ is not a problem if $x_1$ and $x_2$ are concrete time instants. Note, however, that $Q(x_1, x_2)$ does not ask for maximal $x_1$ and $x_2$ for which the formula holds. Thus, the answer to $Q(x_1, x_2)$ on $G_5$ is infinite since it contains each mapping μ such that $5 \leq \mu(x_1) \leq \mu(x_2) \leq +\infty$.

Answers can be restricted to contain only mappings that refer to time instants explicitly occurring in G, but such a solution is also problematic. First, answers can contain redundant mappings. For example, in the answer to $Q(x_1, x_2)$ on $G_5$, mapping; $\mu_1 = \{x_1 \rightarrow 5, x_2 \rightarrow +\infty\}$ is the "most general one", but the answer also contains a "less general" mapping $\mu_2 = \{x_1 \rightarrow 9, x_2 \rightarrow 12\}$, which increases complexity for applications. Second, answers can differ on syntactically different but semantically equivalent temporal graphs. For example, temporal graph $G_6$={(a, b, c)[5,10], (a, b, c)[7, +∞]} is equivalent to $G_5$ under simple entailment; however, $\mu_2$ is not contained in the answer to $Q(x_1, x_2)$ on $G_6$, and $\mu_3 = \{x_1 \rightarrow 7, x_2 \rightarrow 10\}$ is not contained in the answer to $Q(x_1, x_2)$ on $G_5$. Third, computing redundant answers can be costly in practice: given a graph with n overlapping intervals, an answer to a formula such as $Q(x_1, x_2)$ consists of mappings that refer to any two pairs of interval endpoints, so the number of mappings in the answer is exponential in n. One might try to address this problem by a suitable notion of general mappings; however, such an ad hoc solution would not have a clear semantic justification.

These problems are handled in two stages. First, primitives that support questions of types Q1-Q3 are introduced, as well as of types Q4-Q5, thus explicitly introducing a notion of maximality into the language.

Q4. Is [$t_1$, $t_2$] the maximal interval such that BGP B holds in G for each time instant in it?

Q5. Is t the smallest/largest instant at which BGP B holds in G?

The notion of answers with respect to $\mathcal{TC}$ is defined, which makes the answers independent from the syntactic form of temporal graphs.

Second, to ensure finiteness, we then define a syntactic notion of safety, which guarantees that only questions of type Q4 and Q5 can "produce" a value.

Definition 4. A temporal group pattern (TGP) is an expression defined inductively as shown below, where B is a BGP, $P_1$ and $P_2$ are TGPs, R is a built-in expression, $t_1 \in \mathcal{T} \cup \{-\infty\} \cup V$, $t_2 \in \mathcal{T} \cup \{+\infty\} \cup V$, and $t_3 \in \mathcal{T} \cup V$. TGPs from the first two lines are called basic.

| | | |
|---|---|---|
| B at $t_3$ | B during $[t_1, t_2]$ | B occurs $[t_1, t_2]$ |
| B maxint $[t_1, t_2]$ | B mintime $t_3$ | B maxtime $t_3$ |
| $P_1$ and $P_2$ | $P_1$ union $P_2$ | $P_1$ opt $P_2$ | $P_1$ filter R |

We redefine a mapping as a partial function $\mu$: $V \rightarrow \mathcal{UBL} \cup \mathcal{TC}$. Let X be an entailment relation and G a temporal graph. Then $ad_x(G) = ad_x(G')$, where G' is the non-temporal graph obtained by replacing all triples in G of the form (s, p, o)[u] and (s, p, o)[$u_1$, $u_2$] with (s, p, o). The answer to a basic TGP P in G under X is the set of mappings defined as specified below, where $\delta_X(\mu(P))$ is a condition from the table Semantics of Temporal Graph Patterns. Answers to all other TGP types are defined in the table Semantics of Group Patterns.

$$[\![P]\!]_G^X = \{\mu \mid dom(\mu) = var(P), rng(\mu) \subseteq ad_x(G) \cup \mathcal{TC}, \text{ and } \delta_x(\mu(P)) \text{holds}\}$$

TABLE

Semantics of Temporal Graph Patterns

| P | $\delta_X(P)$ |
|---|---|
| B at $t_3$ | $\xi_x(G) \models \exists b_x(B): \pi_x(B)(t_3)$ |
| B during $[t_1, t_2]$ | $\xi_x(G) \models \exists b_x(B) \, \forall x^t: [t_1 \le x^t \le t_2] \rightarrow \pi_x(B)(x^t)$ |
| B occurs $[t_1, t_2]$ | $\xi_x(G) \models \exists b_x(B) \, \exists x^t: [t_1 \le x^t \le t_2 \wedge \pi_x(B)(x^t)]$ |
| B maxint $[t_1, t_2]$ | a function $\sigma: b_x(B) \rightarrow ub_x(G)$ exists such that $\xi_x(G) \models \forall x^t [t_1 \le x^t \le t_2] \rightarrow \pi_x(\sigma(B))(x^t)$, and $t_1 = -\infty$ or $\xi_x(G) \not\models \pi_x(\sigma(B))(t_1 - 1)$, and $t_2 = +\infty$ or $\xi_x(G) \not\models \pi_x(\sigma(B))(t_2 + 1)$ |
| B mintime $t_3$ | a function $\sigma: b_x(B) \rightarrow ub_x(G)$ exists such that $\xi_x(G) \models \pi_x(\sigma(B))(t_3)$ and $\xi_x(G) \not\models \pi_x(\sigma(B))(x^t)$ for each $x^t \in \mathcal{TI}$ with $x^t \le t_3 - 1$ |
| B mintime $t_3$ | a function $\sigma: b_x(B) \rightarrow ub_x(G)$ exists such that $\xi_x(G) \models \pi_x(\sigma(B))(t_3)$ and $\xi_x(G) \not\models \pi_x(\sigma(B))(x^t)$ for each $x^t \in \mathcal{TI}$ with $t_3 + 1 \le x^t$ |

Note:
$\delta_x(P)$ does not hold if P is malformed (e.g., if it is of the form B at $t_3$ and $t_3 \notin \mathcal{TI}$); and $\sigma(B)$ is the result of replacing each blank node v in B with $\sigma(v)$.

We next turn our attention to the formal properties of TGPs. By Definition 4, $ad_x(G)$ does not contain time constants occurring in G, and answers are defined with respect to $\mathcal{TC}$, which ensures that answers do not depend on the syntactic form of temporal graphs. For example, temporal graphs $G_5$ and $G_6$ mentioned earlier are equivalent, and $ad_x(G_5) = ad_x(G_6)$, so $$[\![P]\!]_{G_5}^X = [\![P]\!]_{G_6}^X$$

for each TGP P.

Proposition 1. Let X be an entailment relation, and let $G_1$ and $G_2$ be temporal graphs such that $G_1 \models_X G_2$, $G_2 \models_X G_1$, and $ad_x(G_1) = ad_x(G_2)$. Then, for each temporal group pattern P, we have $$[\![P]\!]_{G_1}^X = [\![P]\!]_{G_2}^X.$$

Definition 5. For P a temporal group pattern, uns(P) is the set of variables as shown in table The Definition of Safety below. Pattern P is safe if and only if uns(P) = ∅.

TABLE

The Definition of Safety

| P | uns(P) |
|---|---|
| B at $t_3$ | $\{t_3\} \cap \mathcal{V}$ |
| B during $[t_1, t_2]$ | $[t_1, t_2] \cap \mathcal{V}$ |
| B occurs $[t_1, t_2]$ | $[t_1, t_2] \cap \mathcal{V}$ |
| $P_1$ and $P_2$ | $uns(P_1) \cup [uns(P_2) \setminus var(P_1)]$ |
| $P_1$ opt $P_2$ | $uns(P_1) \cup [uns(P_2) \setminus var(P_1)]$ |
| B maxint $[t_1, t_2]$ | ∅ |
| B mintime $t_3$ | ∅ |
| B maxtime $t_3$ | ∅ |
| $P_1$ union $P_2$ | $uns(P_1) \cup uns(P_2)$ |
| $P_1$ filter R | $uns(P_1)$ |

Intuitively, $x \in uns(P)$ means that there is no guarantee that $\mu(x) \in \mathcal{TC}$ implies $\mu(x) \in tc_x(G)$ for each $$\mu \in [\![P]\!]_G^X.$$

Thus, B at $t_3$, B during $[t_1, t_2]$, and B occurs $[t_1, t_2]$ are safe if and only if $t_1$, $t_2$ and $t_3$ are not variables: B can hold at potentially infinitely many time intervals, which could give rise to infinite answers if $t_1$, $t_2$ or $t_3$ were variables. In contrast, B maxint $[t_1, t_2]$, B mintime $t_3$, and B maxtime $t_3$ are always safe as there are finitely many maximal intervals in which B holds. The nontrivial remaining cases are $P_1$ and $P_2$ and $P_1$ opt $P_2$, where we assume that $P_1$ is evaluated "before" $P_2$, that is, that the values for variables obtained by evaluating $P_1$ are used to bind unsafe variables in $P_2$; this will be made precise shortly in the algorithm for evaluating TGPs. Thus, ($B_1$ occurs [x, y]) and ($B_2$ maxint [x, y]) is not safe while ($B_2$ maxint [x, y]) and ($B_1$ occurs [x, y]) is, which may seem odd given that conjunction is commutative. Without a predefined evaluation order, however, the examination of every possible order of conjuncts in a conjunction to find an "executable" one would be needed, which could be impractical.

Next, an algorithm for evaluating TGPs is presented. First, it is described how to decide three types of temporal entailment that are used as basic building blocks of our evaluation algorithm. Before this, some auxiliary definitions are introduced.

Let G be a temporal graph and X an entailment relation. A pair of time constants ($t_1$, $t_2$) is consecutive in G if $t_1$, $t_2 \in tc_x(G)$, $t_1 < t_2$ and no $t \in tc_x(G)$ exists with $t_1 < t < t_2$.

The representative of such ($t_1$, $t_2$) is defined as $t_1 + 1$ if $t_1 \ne -\infty$, $t_2 - 1$ if $t_1 = -\infty$ and $t_2 \ne +\infty$, and 0 otherwise.

Furthermore, $ti_x(G) \subseteq \mathcal{TI}$ is the smallest set that contains $tc_x(G) \cap \mathcal{TI}$ and the representative of each consecutive pair of time constants in G.

Finally, note that by Definitions 2 and 3, $\xi x(G)$ contains $\wedge_{u \in ubx(G)} O(u) \wedge \wedge$ and zero or more formulae of the form $\forall x^t: \varphi_i(x^t)$, and $\wedge$ is a conjunction of formulae of the form $\psi_i(t_i)$ and $\forall x^t: (t_i^1 \le x^t \le t_i^2) \rightarrow k_i(x^t)$; then, for $t \in \mathcal{TI}$, $\Xi_x(G, t)$ is the set of all O(u), all $\psi_i$ such that $t_i = t$, all $k_i$ such that $t_i^1 \le t \le t_i^2$, and all $\varphi_i$.

Proposition 2. Let G be a temporal graph, let X be an entailment relation; let B be, a BGP such that var(B) = ∅, and let $t_1 \in \mathcal{TI} \cup \{-\infty\}$, $t_2 \in \mathcal{TI} \cup \{+\infty\}$, and $t_3 \in \mathcal{TI}$. Then, the following claims hold:

1. $\xi_x(G)$ is satisfiable if and only if $\Xi_x(G, t)$ is satisfiable for each $t \in ti_x(G)$.

2. $\xi_x(G) \models \exists b_x(B): \pi_x(B)(t_3)$ if and only if $\xi_x(G)$ is unsatisfiable or some function $\sigma: b_x(B) \rightarrow ub_x(G)$ exists such that $\Xi_x(G, t_3) \models \pi_x(\sigma(B))$,

TABLE

Evaluation of Temporal Group Patterns
$eval_X(P, G)$ is the set of mappings defined as
follows depending on the type of P:

P = B at $t_3$ or P = B during $[t_1, t_2]$ or P = B occurs $[t_1, t_2]$:
$\{\mu \mid dom(\mu) = var(B), rng(\mu) \subseteq ad_X(G), \text{ and } \delta_X(\mu(P)) \text{ holds}\}$
P = B maxint $[t_1, t_2]$:
$\{\mu \mid dom(\mu) = var(P), rng(\mu) \subseteq ad_X(G) \cup ti_X(G) \cup \{-\infty, +\infty\}, \text{ and } \delta_X(\mu(P)) \text{ holds}\}$
P = B mintime $t_3$:
$\{\mu \mid dom(\mu) = var(P), rng(\mu) \subseteq ad_X(G) \cup ti_X(G), \delta_X(\mu(B \text{ at } t_3)) \text{ holds}, \text{ and } \delta_X(\mu(B \text{ at } t')) \text{ does not hold for all } t' \in ti_X(G) \text{ such that } t' < \mu(t_3) - 1\}$
P = B maxtime $t_3$:
$\{\mu \mid dom(\mu) = var(P), rng(\mu) \subseteq ad_X(G) \cup ti_X(G), \delta_X(B \text{ at } t_3)) \text{ holds, and } \delta_X(\mu(B \text{ at } t')) \text{ does not hold for all } t' \in ti_X(G) \text{ such that } \mu(t_3) + 1 \le t'\}$
P = $P_1$ and $P_2$:
$\{\mu_1 \cup \mu_2 \mid \mu_1 \in eval_X(P_1, G) \text{ and } \mu_2 \in eval_X(\mu_1(P_2), G)\}$
P = $P_1$ union $P_2$:
$eval_X(P_1, G) \cup eval_X(P_2, G)$
P = $P_1$ opt $P_2$:
$eval_X(P_1 \text{ and } P_2, G) \cup \{\mu \in eval_X(P_1, G) \mid eval_X(\mu(P_2), G) = \emptyset\}$
P = $P_1$ filter R:
$\{\mu \in eval_X(P_1, G) \mid \mu \models R\}$.

3. $\xi_X(G) \models \exists b_X(B) \forall x^r: [t_1 \le x^r \le t_2] \to \pi_X(B)(x^r) \text{iff} \xi_X(G)$ is unsatisfiable or some $\sigma: b_X(G) \to ub_X(G)$ exists such that $\Xi_X(G, t) \models \pi_X(\sigma(B))$ for each $t \in ti_X(G)$ with $t_1 \le t \le t_2$.

4. $\xi_X(G) \models \exists b_X(B) \exists x^r: [t_1 \le x^r \le t_2 \wedge \pi_X(B)(x^r)]$ iff $\xi_X(G)$ is unsatisfiable or some $\sigma: b_X(B) \to ub_X(G)$ exists such that $\Xi_X(G, t) \models \pi_X(\sigma(B))$ for some time $t \in ti_X(G)$ with $t_1 \le t \le t_2$.

Proposition 2 reduces temporal entailments to standard entailment problems that can be solved using any decision procedure available. This provides a way to check conditions $\delta_X(\mu(P))$ needed to evaluate safe TGPs.

Furthermore, note that the third claim above can be straightforwardly extended to general temporal graph entailment.

We use these results as building blocks for the function shown in the table Evaluation of Temporal Group Patterns that evaluates safe temporal group patterns. For P a basic TGP, $eval_X(P, G)$ can be computed by enumerating all mappings potentially relevant to P and then eliminating those mappings that do not satisfy the respective conditions; optimizations can be used to quickly eliminate irrelevant mappings.

Proposition 3. Let G be a temporal graph, let X be an entailment relation such that $ad_X(G)$ is finite, and let P be a safe temporal group pattern. Then $exal_X(P,G) = [\![ P ]\!]_G^X$ and $\vdash P \vdash_G^X$ is finite.

3.3.1.4. Optimized Query Answering

The algorithm for evaluating TGPs presented in the previous section checks temporal entailment using a black box decision procedure, which can be inefficient. In this section, first, an optimization of this algorithm that is applicable to simple entailment is presented, and second, this approach is extended to any entailment relation that can be characterized by deterministic rules, such as RDF(S) and OWL 2 RL.

3.3.1.4.1. Simple Entailment

Simple entailment is the basic entailment relation in which BGPs can be evaluated in nontemporal graphs by simple graph lookup.

Such an approach provides the basis of virtually all practical RDF storage systems and has proved itself in practice, so it would be beneficial if similar approaches were applicable to TGPs and temporal graphs, but, unfortunately, running some examples quickly demonstrates that this is not the case, and the graph needs to be normalized before simple entailment can be used to evaluate TGPs.

Temporal triples $(s, p, o)[t_1, t_2]$ and $(s', p', o')[t'_1, t'_2]$ are said to overlap if $s=s'$, $p=p'$, $o=o'$ and $max(t_1, t'_1) \le min(t_2, t'_2)$; this definition is extended to triples of the form $(s, p, o)[t_1]$ by treating them as abbreviations for $(s, p, o)[t_1, t_1]$.

Let G be a temporal graph and let $A \in G$ be a temporal triple. The maximal subset of G with respect to A is the smallest set $G_A \subseteq G$ such that $A \in G_A$ and, if $\beta \in G_A$, $\gamma \in G$, and $\beta$ and $\gamma$ overlap, then $\gamma \in G_A$ as well.

The normalization of G is the temporal graph $nrm(G)$ that, for each $A \in G$ of the form $(s, p, o)[t_1, t_2]$ or $(s, p, o)[t_1]$, contains the temporal triple $(s, p, o)[t'_1, t'_2]$ where $t'_1$ and $t'_2$ are the smallest and the largest temporal constant, respectively, occurring in the maximal subset $G_A$ of G with respect to A.

Let G' be the list of the temporal triples in G of the form $(s, p, o)[t_1, t_2]$ and $(s, p, o)[t_1]$ sorted by s, p, o, $t_1$, and $t_2$. For each $A \in G$, the triples that constitute the maximal subset $G_A$ of G occur consecutively in G', so $nrm(G)$ can be computed by a simple sequential scan through G'.

Next, it is described to use $nrm(G)$ to evaluate temporal group patterns. Let $B = \{(s_1, p_1, o_1), \ldots, (s_k, p_k, o_k)\}$ be a BGP, let $x_1, \ldots, x_k$ and $y_1, \ldots, y_k$ be variables not occurring in B, and let G be a temporal graph. Then $(B)^G$ is the set of all mappings $\mu$ such that $dom(\mu) = var(B) \cup \{x_1, y_1, \ldots, x_k, y_k\}$, $\mu((s_i, p_i, o_i)[x_i, y_i]) \in nrm(G)$ for each $1 \le i \le k$, and $\mu^\downarrow \le \mu^\uparrow$, where the latter are defined as $\mu^\downarrow = max\{\mu(x_1), \ldots, \mu(x_k)\}$ and $\mu^\uparrow = min\{\mu(y_1), \ldots, \mu(y_k)\}$. Furthermore, for a mapping $\nu$, let $\nu|_B$ be the restriction of $\nu$ to $var(B)$. The table Evaluation of Temporal Group Patterns under Simple Entailment then shows how to evaluate basic TGPs under simple entailment with normalization.

TABLE

Evaluation of Temporal Group Patterns under Simple Entailment
$eval_{simple}(P, G)$ is the set of mappings defined as follows:

P = B at $t_3$:
$\{\nu \mid dom(\nu) = var(P) \text{ and } \exists \mu \in (B)^G: \nu|_B = \mu|_B \wedge \mu^\downarrow \le t_3 \le \mu^\uparrow\}$
P = B during $[t_1, t_2]$:
$\{\nu \mid dom(\nu) = var(P) \text{ and } \exists \mu \in (B)^G: \nu|_B = \mu|_B \wedge \mu^\downarrow \le t_1 \le t_2 \le \mu^\uparrow\}$
P = B occurs $[t_1, t_2]$:
$\{\nu \mid dom(\nu) = var(P) \text{ and } \exists \mu \in (B)^G: \nu|_B = \mu|_B \wedge max(\mu^\downarrow, t_1) \le min(\mu^\uparrow, t_2)\}$
P = B maxint $[t_1, t_2]$:
$\{\nu \mid dom(\nu) = var(P) \text{ and } \exists \mu \in (B)^G: \nu|_B = \mu|_B \wedge \nu(t_1) = \mu^\downarrow \wedge \nu(t_2) = \mu^\uparrow\}$
P = B mintime $t_3$:
$\{\nu \mid dom(\nu) = var(P) \text{ and } \exists \mu \in (B)^G:$
$\mu^\downarrow \in TI \wedge \nu|_B = \mu|_B \wedge \nu(t_3) = \mu^\downarrow \wedge \forall \lambda \in (B)^G: \mu|_B = \lambda|_B \to \mu^\downarrow \le \lambda^\downarrow\}$
P = B maxtime $t_3$:
$\{\nu \mid dom(\nu) = var(P) \text{ and } \exists \mu \in (B)^G:$
$\mu^\downarrow \in TI \wedge \nu|(t_3) = \mu^\uparrow \wedge \forall \lambda \in (B)^G: \mu|_B = \lambda|_B \to \lambda^\uparrow \le \mu^\uparrow\}$ Proposition 4. For each a temporal graph G and each safe temporal group pattern P, we have $eval_{simple}(P,G) = [\![ P ]\!]_G^{simple}$.

We explain the intuition behind this algorithm for P=B maxint $[t_1, t_2]$. First, we compute $(B)^G$ by evaluating the conjunctive query $\Lambda(s_i, p_i, o_i)[x_i, y_i]$ in $nrm(G)$ via simple lookup. Consider now an arbitrary $\mu \in (B)^G$. By the definition of normalization, each $\mu(x_i)$ and $\mu(y_i)$ determine the maximal validity interval of $(s_i, p_i, o_i)$, so, to answer P, we must intersect all intervals $[\mu(x_i), \mu(y_i)]$. Note that $\mu^\downarrow$ and $\mu^\uparrow$ give the lower and the upper limit of the intersection, provided that $\mu^\downarrow \le \mu^\uparrow$. Thus, what remains to be done is to convert into $\mu$ into $\nu$ by setting $\nu(x) = \mu(x)$ for each $x \in var(B)$ and ensuring that $\nu(t_1) = \mu^\downarrow$ and $\nu(t_2) = \mu^\uparrow$.

3.3.1.4.2. Entailments Characterized by Deterministic Rules

Let X be an entailment relation that can be characterized by a set $\Gamma_X$ of deterministic rules of the form $A_1 \wedge \ldots \wedge A_n \rightarrow B$. To evaluate a SPARQL group pattern in a graph under X-entailment, most existing (nontemporal) RDF systems first compute the closure of the graph with respect to $\Gamma_X$. We next show how to compute the temporal closure $cls_X(G)$ of a temporal graph G using the rules from $\Gamma_X$. After computing the closure, we can normalize it and then apply the algorithm described in the Simple Entailment section.

Definition 6. For X and $\Gamma_X$ as stated above, let $\Sigma_X$ be the set containing the rule described below for each rule $A_1 \wedge \ldots \wedge A_n \rightarrow B$ in $\Gamma_X$.

$$A_1[x_1,y_1] \wedge \ldots \wedge A_n[x_n,y_n] \wedge \max(x_1, \ldots, x_n) \leq \min(y_1, \ldots, y_n) \rightarrow B[\max(x_1, \ldots, x_n), \min(y_1, \ldots, y_n)]$$

Let G be a temporal graph consisting of triples of the form $(s, p, o)[t_1, t_2]$ (for simplicity we assume that G does not contain triples of the form $(s, p, o)[t_1]$) The skolemization of G is a temporal graph obtained from G by replacing each blank node with a fresh URI reference.

Furthermore, the temporal closure of G is the (possibly infinite) temporal graph $cls_X(G)$ obtained by exhaustively applying the rules in $\Sigma_X$ to the skolemization of G.

The following proposition shows that, instead of evaluating TGPs in G under X-entailment, one can evaluate them in $cls_X(G)$ under simple entailment.

Proposition 5. Let X and G be as stated in Definition 6. For each temporal group pattern P, we have $\vdash P \vDash_G^{X} = \vdash P[_{G'}^{simple}$, where $G' = cls_X(G)$.

3.3.2. A system capable of storing temporal ontologies, reasoning over temporal ontologies and answering queries over temporal ontologies, using the approach described in the section Representing and Querying Validity Time in RDF, OWL and SPARQL above A system implementing the approach described in the section Representing and querying validity time in RDF, OWL and SPARQL consists of the following components:
- o. Temporal Graph Storage: The task of this component is to store the temporal triples of a temporal graph G.
- p. Normalized Graph Storage: This component is optional and it needs to be present only if the system uses the optimized algorithms described in the section Optimized Query Answering above. From a functional point of view, this component is identical to the previous one, because a normalized graph is a temporal graph satisfying certain additional restrictions. Therefore, the task of this component is to store the temporal triples in nrm(G).
- q. Rule Processor: This component is optional and it needs to be present only if the system uses the optimized algorithms described in the section Optimized Query Answering above. This component is given a deterministic entailment relation X upon which the component computes the closure of G with respect to the set of rules $\Gamma_X$ (as described above, $\Gamma_X$ is the set of first-order rules that characterize X).
- r. Query Processor: This component accepts a TGP and evaluates it in G or nrm(G) using the algorithms described in the section Querying temporal graphs above.

In some embodiments, the system presented in this section is implemented in the DDB for storing, reasoning and answering queries over temporal ontologies.

Next, these components are described in detail.

3.3.2.1. Temporal Graph Storage

The input to our system is a document D containing the triples of a temporal RDF graph. The system needs to be able to parse D, convert it into a temporal graph G, and store it somewhere; the latter is the task of the temporal graph storage component.

At an abstract level, the temporal graph storage component provides data structures for storing and accessing triples in the graph. Additionally, it provides an interface that allows one to ask questions such as "return all temporal triples that contain a particular URI reference in the subject position" or "return the validity time of a certain triple."

Furthermore, in different embodiments, the temporal graph storage component uses a number of storage modes, that is, different approaches for storing the triples, such as in-memory storage mode, on-disk storage mode and relational database management system (RDBMS) storage mode. The precise capabilities of the query interface and the storage mode, however, can be abstracted from the main features of the system.

The temporal graph storage component thus is responsible mainly for importing a temporal graph G and retrieving various parts of G. The temporal graph storage component also supports incremental changes to G (i.e., deleting parts of G and extending G with additional temporal triples); however, such functionality is not essential for the main features of the system.

3.3.2.2. Normalized Graph Storage

This component is quite similar to the temporal graph storage in that it provides data structures for storing triples of a temporal graph. The main difference, however, is that normalized graph storage takes a temporal graph G (stored in the temporal graph storage), computes the normalization nrm(G), and then stores the result. The normalization is computed as outlined herein.
- s. The triples in G are sorted lexicographically by taking each temporal tuple $(s, p, o)[t_1, t_2]$ to be equivalent to $(s, p, o, t_1, t_2)$ for the purposes of sorting.

The resulting list or sorted tuples is then scanned from beginning to end. The triples containing the same s, p, o thus occur consecutively in the sorted list, so each such block of triples is processed as specified below.
  1. $[t_1, t_2]$ is initialized to the validity time of the first triple in the block.
  2. All remaining triples in the block are scanned. For each triple with validity time $[t'_1, t'_2]$, the following is performed: if $t'_1 > t_2$ then $(s, p, o)[t_1, t_2]$ is added to nrm(G), and $[t_1, t_2]$ is set to $[t'_1, t'_2]$, otherwise, $t_2$ is set to $t'_2$.
  3. After the last triple in the block is processed, $(s, p, o)[t_1, t_2]$ is added to nrm(G)

3.3.2.3. Rule Processor

The rule processor is used only if the system is to compute answers to temporal graph patterns under a deterministic relation X as described in the section Querying temporal graphs above.

The task of a rule processor is to compute the closure of a temporal graph using the rules from $\Gamma_x$, that is, to extend G with all of its consequences under $\Gamma_x$. It is not really relevant when and how this closure is computed, and the system allows the computation of the closure immediately after a document is imported into the temporal graph storage, and, alternatively, the system can support incremental updates; thus, if G is modified by adding or removing several triples, the system uses sophisticated algorithms that update the closure without re-computing it from scratch (using techniques like the ones described in the section Incremental reasoning in the DDB above).

All this, however, is not relevant for the main features of the system, the only important point is that the closure is computed or updated before the system attempts to compute an answer to a TGP. If the algorithms from the section Optimized Query Answering above are in use, then the normalized graph storage should be updated after the closure is computed.

Numerous ways for computing the closure or a set of rules are known in the literature, such as the semi-naïve datalog evaluation strategy.

This is described by means of an example. Assume for example that $\Gamma_x$ contains the following rule:

$$(x,p_1,y) \wedge (x,p_2,y) \rightarrow (x,p3,y)$$

The rule processor first transforms this rule into the rule presented below:

$$(x,p_1,y)[x_1,y_1] \wedge (x,p_2,y)[x_2,y_2] \wedge \max(x_1,x_2) \leq \min(y_1,y_2) \rightarrow (x,p3,y)[\max(x_1,x_2),\min(y_1,y_2)]$$

Assume now that G contains the following temporal triples:

$$(a,p_1,b)[4,7]$$

$$(a,p_2,c)[5,9]$$

The rule processor will try to match the variables in the transformed rule to the facts in G. One such match is the mapping $\mu$ such that $\mu(x)=a$, $\mu(y)=b$, $\mu(x_1)=4$, $\mu(y_1)=7$, $\mu(x_2)=5$, and $\mu(x_y)=9$. Now $\max(x_1, x_2)=5$ and $\min(y_1, y_2)=7$, so the antecedent of the rule is satisfied; therefore, rule processor extends G with the following temporal triple:

$$(a,p_3,b)[5,7]$$

The rule processor will keep repeating this process until no further temporal triples can be added to G.

3.3.2.4. Query Processor

The query processor accepts a TGP P and an entailment relation X, and its task is to compute the answer $\models P\models^X_G$ to P under X on the graph G stored in the temporal graph storage.

The query processor can do this in two distinct ways:
  t. If X is deterministic, and if the closure of G under $\Gamma_x$ has been computed, and if the normalization of the closure is up-to-date, then query processor can use the optimized algorithm described in the section Optimized Query Answering above.
  u. In all other cases, the query processor needs to use the general algorithm from the section Querying Temporal Graphs above.

In the rest of this section, these two algorithms are described in more detail.

3.3.2.4.1. The General Algorithm

The basic idea behind the general algorithm is to build a query answering procedure around a preexisting procedure for checking X-entailment between nontemporal graphs. For example, if X is the OWL 2 DL entailment, such procedures have been implemented in various description logic reasoners, such as HermiT or Pellet. Thus, an algorithm for answering TGPs can be build by reusing HermiT or Pellet as the underlying reasoning engine. The TGP answering algorithm from the section Querying Temporal Graphs consists of two main parts:

3.3.2.4.1.1. Deciding Temporal Entailment

To answer TGPs, the query algorithm will need to decide certain temporal entailment questions. For example, given a temporal graph G stored in the temporal graph storage, the algorithm will need to check whether a temporal triple (s, p, o)[t] is a logical consequence of G at all time instants t in a certain interval $t_1 \leq t \leq t_2$. Note that so far no procedures are known that can be used to solve such problems, so the first step is to provide an algorithm for this. Such an algorithm is actually presented in Proposition 2, this proposition shows how one can decide questions such as the one mentioned above by using a procedure for checking X-entailment as a black box.

Item 1 of Proposition 2 allows us to check whether G is satisfiable, that is, whether it contains a logical contradiction. The idea is to check satisfiability of "slices" of G at different time instants. Thus, given a temporal graph G, the procedure is as follows:

1. The set of time instants $ti_x(G)$ is computed. Initially, $ti_x(G)$ is set to be the set of all time instants occurring in G. Then, we consider each pair of time instants $(t_1, t_2)$ that is consecutive in G, that is, for which $t_1 < t_2$ and there is no time instant in G that comes between $t_1$ and $t_2$. For each such pair, we extend $ti_x(G)$ with $t_1+1$, $t_2-1$, or 0, as described in Proposition 2. After this step, $ti_x(G)$ contains the set of "relevant" time instants, that is, time points at which we must check whether something "bad" happens.
2. We then consider each time instant $t \in ti_x(G)$ and check whether the "slice" $\Xi_x(G, t)$ of G at t (i.e., the nontemporal graph describing the contents of G at time t) is consistent. To this end, we compute the formula $\Xi_x(G, t)$ as specified in the paper (i.e., by selecting those temporal triples from G that hold at time instant t and removing the temporal markers), and then we simply check satisfiability of the nontemporal formula $\Xi_x(G, t)$ using some existing nontemporal reasoner as a black box.
3. If $\Xi_x(G, t)$ is satisfiable for each t, then G is satisfiable as well; otherwise, if $\Xi_x(G, t)$ is unsatisfiable for some t, then G is unsatisfiable.

The other cases of Proposition 2 are analogous. The main difference is in the treatment of blank nodes in the entailed formula. Consider, for example, Item 2. For G to entail some basic graph pattern B at some time instant $t_3$, we need to find a mapping a from the blank nodes of B to the URI references and blank nodes of G. This can be done in many different ways: we might examine all possible mappings $\sigma$ and check each one individually, or we might use some algorithm specially optimized for that purpose. Either way, for each such mapping $\sigma$, we compute $\sigma(B)$ and then check (using a black box procedure for nontemporal entailment) whether $\sigma(B)$ is a logical consequence of the "slice" $\Xi_x(G, t_3)$ of G at time point $t_3$. If the latter is the case, then B is indeed entailed by G at time point $t_3$; otherwise, if the latter is not the case for each mapping $\sigma$, then B is not entailed by G at time point $t_3$.

3.3.2.4.1.2. Computing TGP Answers

Armed with Proposition 2 that allows us to reduce certain questions about temporal entailment to nontemporal entailment, we can compute the answer to a TGP P on G under entailment relation X using the algorithm shown in the table Evaluation of Temporal Group Patterns. This table should be understood as providing us with an algebra: it shows how to compute answers to basic TGPs, and in the Preliminaries section, it was shown how to compute an answer to TGPs involving conjunction and union. Thus, the answer to P can be computed by recursively evaluating subexpressions of P and combining the answers as shown in the mentioned Preliminaries section.

The part of the evaluation presented in the Preliminaries section is straightforward: the subexpressions are recursively evaluated, and the results of the subexpressions are combined using the algebraic specification provided.

In the rest of this section, we describe the evaluation of basic TGPs. We consider the case for P=B maxint $[t_1, t_2]$; the remaining cases are treated analogously. The answer to such P on G under X can be computed using the following procedure, which encodes the formula shown in the second row of the table Evaluation of Temporal Group Patterns.

1. Compute the active domain $ad_x(G)$ according to the rules of the entailment relations X A description of how this is done should be included in the formal definition of X.
2. Compute the set of the relevant time instants $ti_x(G)$ as outlined above.
3. Enumerate all possible mappings μ over the variables in var(P) with values in $ad_x(G) \cup ti_x(G) \cup \{-\infty, +\infty\}$. For each such μ perform the following tasks.
   a. Compute μ(P) and check whether $\delta_x(\mu(P))$ holds, which can be ascertained as shown in the table Semantics of Temporal Graph Patterns. The check involves finding a substitution σ and then checking three temporal entailments; the latter can be reduced to nontemporal entailment (and thus implemented using a black box procedure for X-entailment) as discussed in Proposition 2.
   b. If $\delta_x(\mu(P))$ holds, then μ is added to the answer of P on G under X.

The processing of TGPs of other forms is analogous to the one outlined above: one always needs to compute the set of mappings as shown in the table Evaluation of Temporal Group Patterns.

The presented algorithm is quite general in its basic form. In some embodiments the algorithm is optimized for specific applications. For example, in some embodiments the algorithm is optimized as described in the following section.

3.3.2.4.2. The Optimized Algorithm

The optimized algorithm in the section Optimized Query Answering above uses a normalization nrm(G) of G to compute answers to temporal group patterns under simple entailment: one merely needs to compute nrm(G) after importing G as outlined above. Combined with the rule application algorithm implemented by the rule processor, this algorithm can also be used for computing answers under a deterministic entailment relation X: after importing G, one applies the rules of X to extend G to its closure under X; one then computes the normalization of the closure, which can then be used for computing query answers.

The optimized algorithm in the section Optimized Query Answering differs from the general algorithm in the section Querying Temporal Graphs only in the way it computes answers to basic TGPs, and the latter is performed as described in table Evaluation of Temporal Group Patterns under Simple Entailment. Next, it is described how this is done when P=B maxint $[t_1, t_2]$. The general idea is that the normalization already provides the maximal intervals for all temporal triples so, if B is a single triple, then the answer to P can be computed by a simple lookup. Assuming that B contains triples $(s_i, p_i, o_i)$ with $1 \le i \le n$, then the answer to P can be computed as follows:

1. The query $Q = \Lambda_{1 \le i \le n} (s_i, p_i, o_i)[x_i, y_i]$ is computed and evaluated in nrm(G). The resulting set of mappings is denoted in the paper as $(B)^G$.
2. Each mapping $\mu \in (B)^G$ is processed as follows.
   a. Compute $\mu^\uparrow = \max(\mu(x_i), \ldots, \mu(x_n))$ and $\mu^\downarrow = \min(\mu(y_1), \ldots, \mu(Y_n))$.
   b. Discard μ if $\mu^\uparrow > \mu^\downarrow$. This step is actually immanent in the definition of $(B)^G$, that is, $(B)^G$ has been defined such that it does not contain mappings μ that do not satisfy this condition.
   c. Compute ν from μ by setting ν(x)=μ(x) for each x∈var(B). (This is the meaning of $\nu|_B = \mu|_B$ in the algorithm).
   d. If $t_1$ is a variable, then set $\mu(t_1) = \mu^\uparrow$; otherwise, check whether $t_1 = \mu^\uparrow$ and discard μ if this is not the case.
   e. If $t_2$ is a variable, then set $\mu(t_2) = \mu^\downarrow$; otherwise, check whether $t_2 = \mu^\downarrow$ and discard μ if this is not the case.
   f. Add μ to the answer of P.

The remaining types of basic TGPs are processed in similar ways.

4. System Architecture

Figure 2:
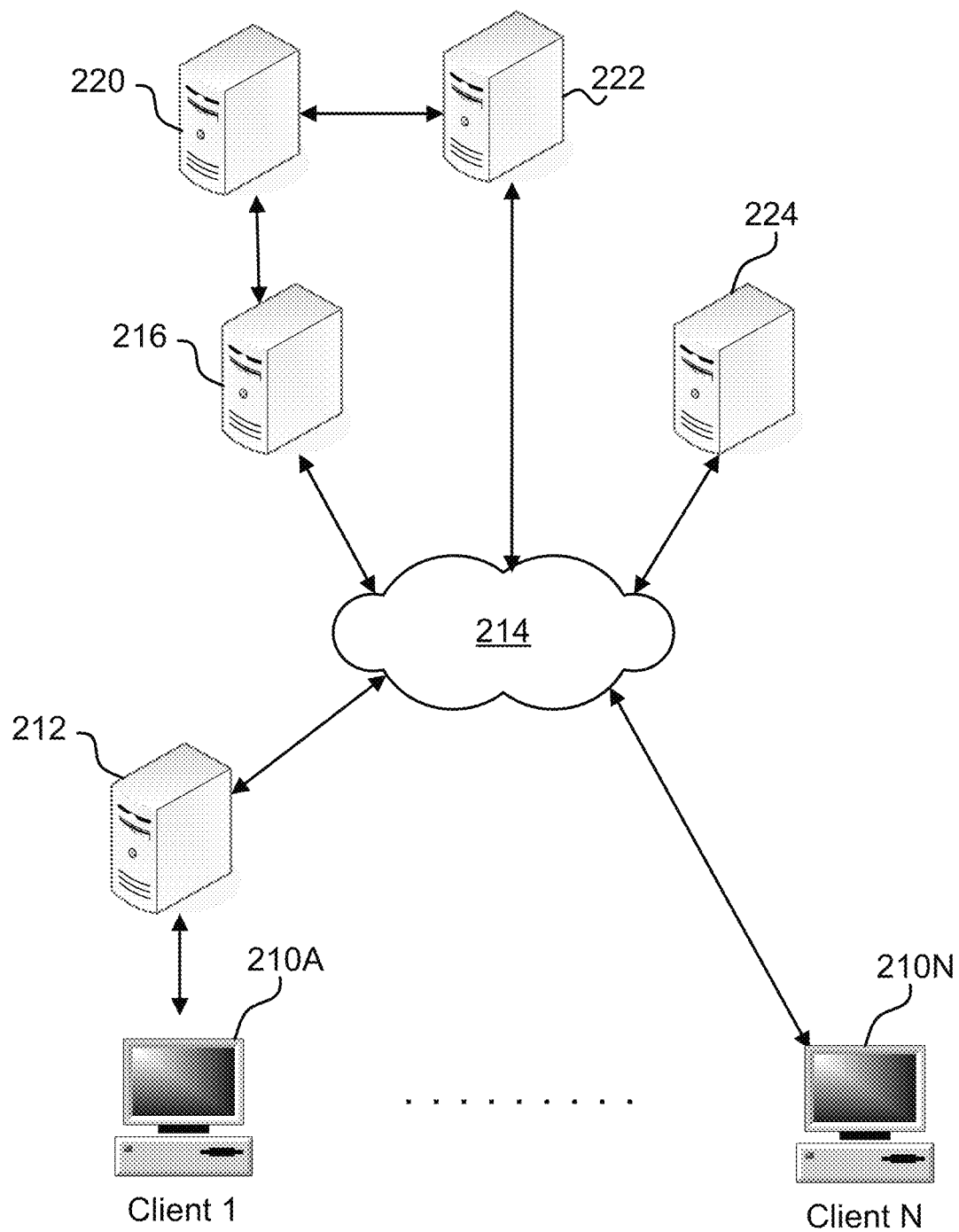
FIG. 2 is a simplified functional block diagram of an embodiment of a networked computer system in which embodiments of the question answering system and method described herein may be implemented.
Figure 3:
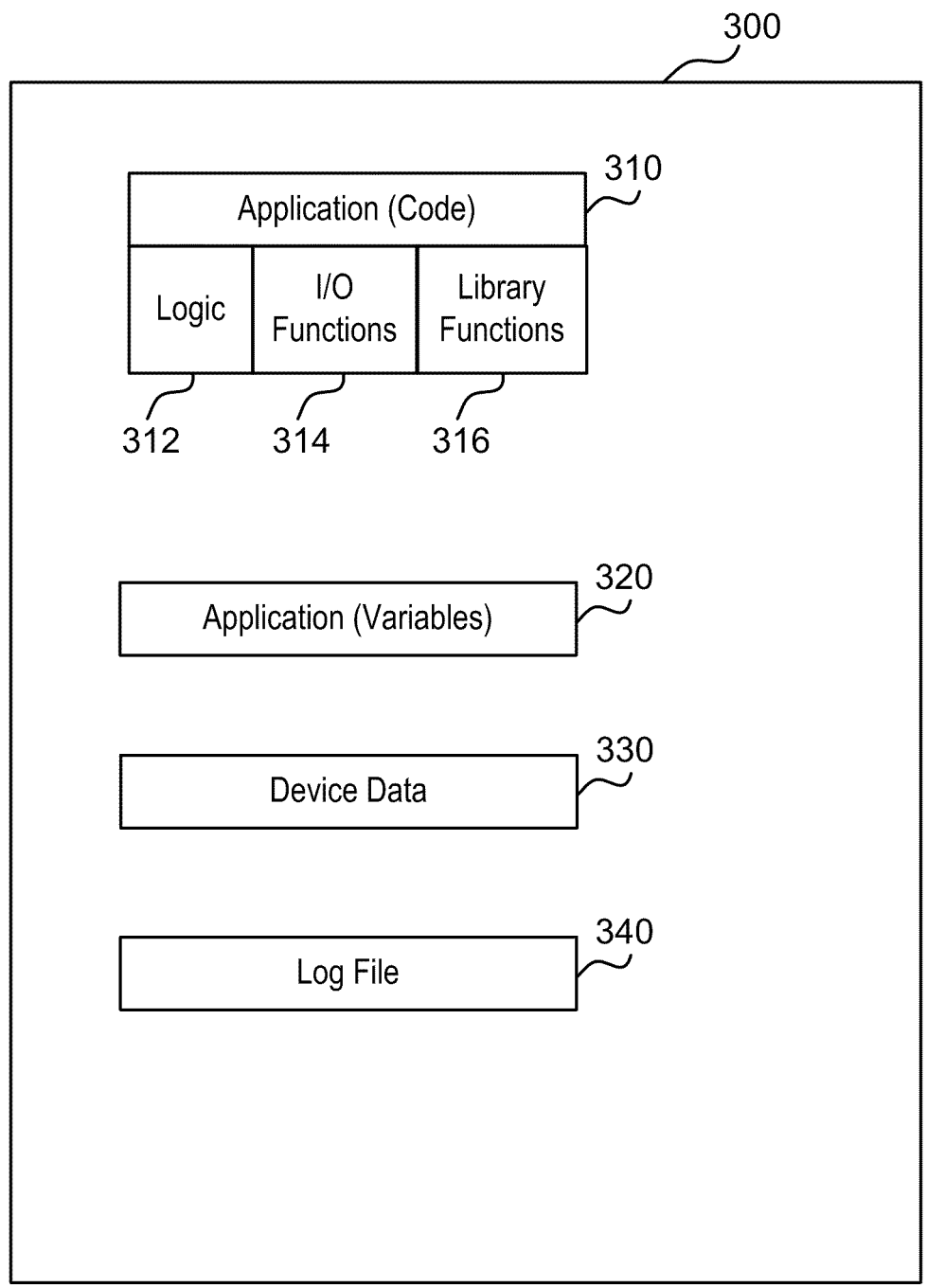
FIG. 3 is a simplified block diagram of a storage device that includes an application that can be accessed and executed by a processor in any of the servers or clients in the computer system of FIG. 2.

FIGS. 1A-1D are flowcharts illustrating examples of methods which can be used with a network of computers, such as the network discussed with reference to FIGS. 2-3. The methods discussed with reference to FIGS. 1A-1D are only one example of the methods described herein and the networks described with reference to FIGS. 2-3 are only one example of the networks which can use the methods described herein. Those skilled in the art will realize that the disclosure described herein can be implemented with other systems and methods.

FIG. 1A is a flowchart illustrating a method answering natural language questions that are provided as an input using deep semantics. The method starts in operation 105 when the computer environment is configured for operation. In operation 110, a natural language question compiler running on a computer receives, as an input, a natural language question. Next in operation 135, the natural language question provided as an input is mapped into one or more deductive database queries that capture one or more intents behind the natural language question. In operation 160, one or more result sets of the natural language question are computed using one or more deductive database queries and a deductive database. Next in operation 185, the one or more result sets of the natural language question are provided, for example to the requester. After the search results have been provided to the designated recipient, the process ends in operation 190. Mapping the natural language question provided as an input into a logical form can be performed by a Natural Language Question Compiler (NLQC). Computing the results to the question using the logical form can be performed by a Deductive Database (DDB). Additional details concerning these and other operations are provided herein.

Figure 1B:
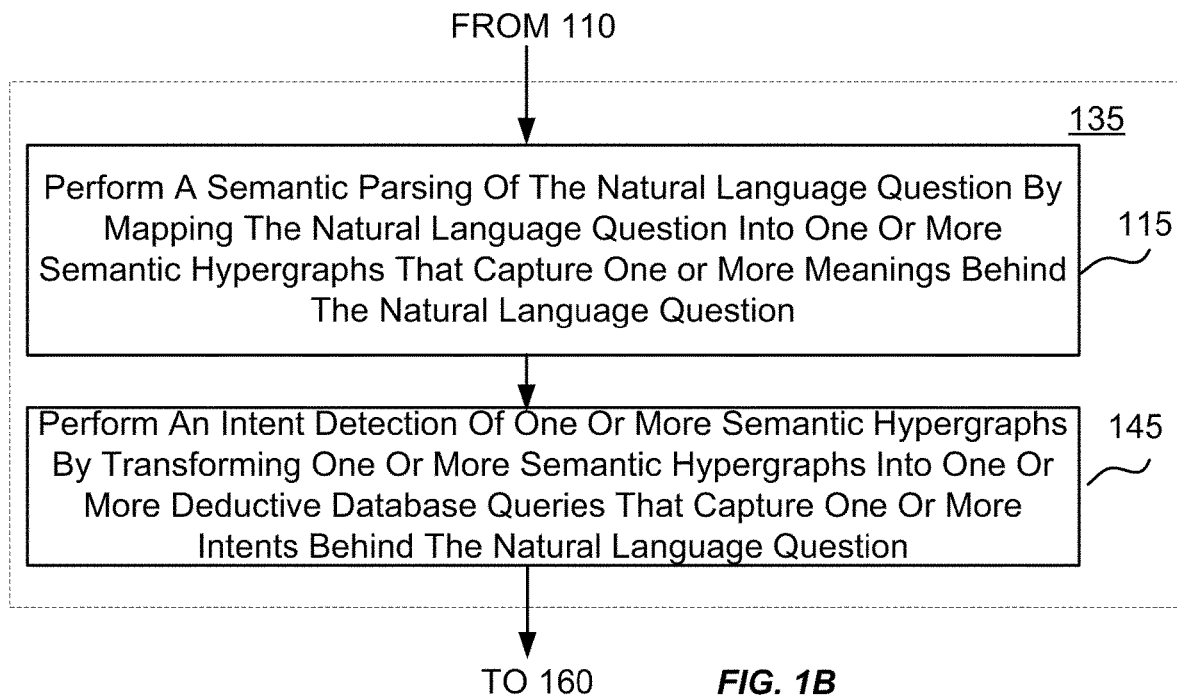
FIG. 1B is a flowchart illustrating operations used to map the natural language question provided as an input into one or more deductive database queries that capture one or more intents behind the natural language question.

FIG. 1B is a flowchart illustrating further details of operation 135, which is used to map the natural language question provided as an input into one or more deductive database queries that capture one or more intents behind the natural language question. In operation 115, a semantic parsing of the natural language question is performed by mapping the natural language question into one or more semantic hypergraphs that capture one or more meanings behind the natural language question. Next in operation 145, an intent detection of the one or more semantic hypergraphs is performed by transforming the one or more semantic hypergraphs into one or more deductive database queries that capture the one or more intents behind the natural language question. The one or more semantic hypergraphs can be represented in a DOL language. The one or more deductive database queries can be represented in a DQL language. Additional details concerning these and other operations are provided herein.

Figure 1C:
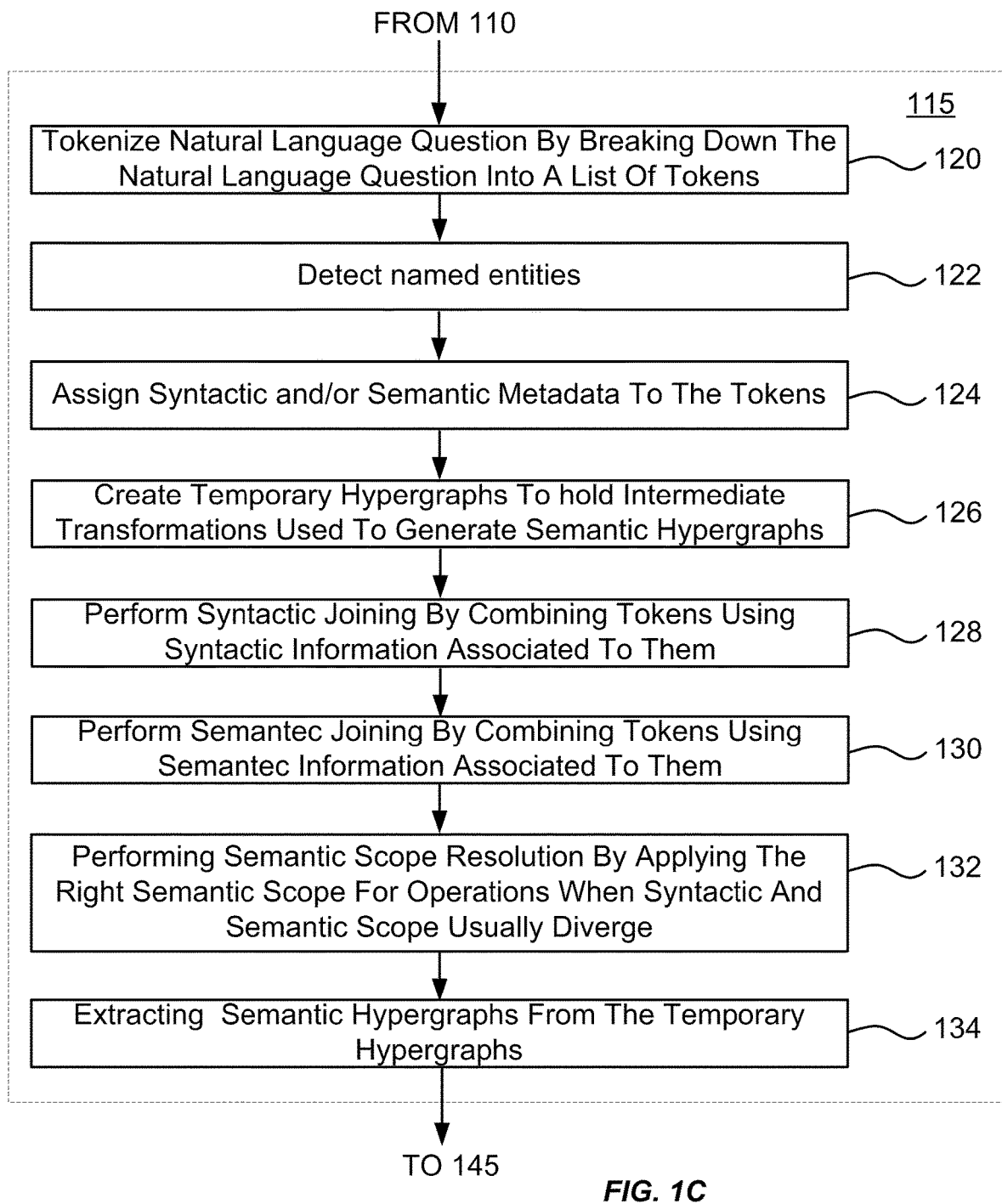
FIG. 1C is a flowchart illustrating details of the semantic parsing operation of the natural language question, as illustrated in FIG. 1B.

FIG. 1C is a flowchart illustrating details of the semantic parsing operation of the natural language question, as illustrated in operation 115 of FIG. 1B. The semantic parsing of the natural language question is performed by mapping the natural language question into one or more semantic hypergraphs that capture one or more meanings behind the natural language question. Performing the semantic parsing of the natural language question begins in operation 120. In operation 120, the natural language question is tokenized by breaking down the natural language question into a list of tokens. Next in operation 122 named entities are detected. In operation 124, syntactic and/or semantic metadata is assigned to the tokens. In operation 126, temporary hypergraphs are created that will be used to hold all the intermediate transformations that are required to generate the semantic hypergraphs. In operation 128, syntactic joining is performed by combining tokens using syntactic information associated to them. Next in operation 130, semantic joining is performed by combining tokens using semantic information associated to them. In operation 132, semantic scope resolution is performed by applying the right semantic scope for operations, whose syntactic and semantic scope usually diverge. In operation 134, the semantic hypergraphs are extracted from the temporary hypergraphs. Additional details concerning these and other operations are provided herein.

Figure 1D:
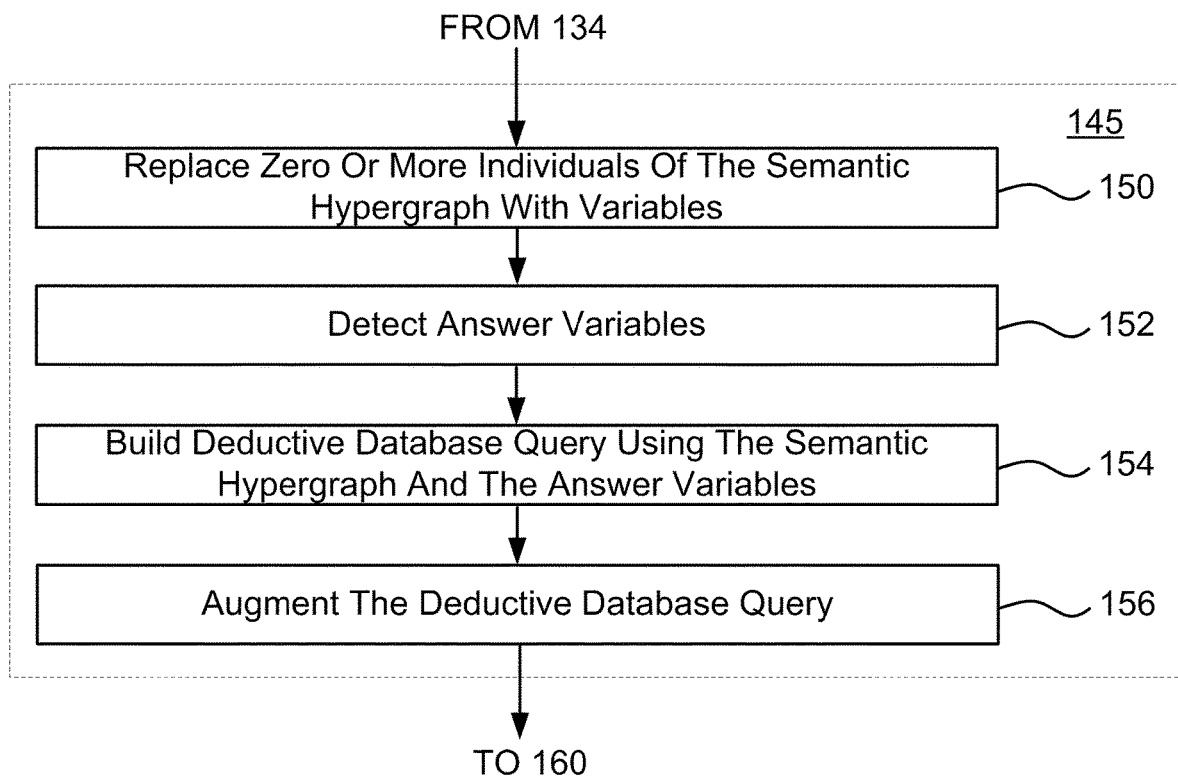
FIG. 1D is a flowchart illustrating details of the intent detection operation of the semantic hypergraph, as illustrated in FIG. 1B.

FIG. 1D is a flowchart illustrating details of the intent detection operation of the semantic hypergraph, as illustrated in operation 145 of FIG. 1B. Performing an intent detection of one or more semantic hypergraphs by transforming one or more semantic hypergraphs into one or more deductive database queries that capture the one or more intents behind the natural language question begins in operation 150. In operation 150, zero or more individuals of the semantic hypergraph are replaced with variables. Next in operation 152, answer variables are detected. In operation 154, a deductive database query is built using the semantic hypergraph and the answer variables. In operation 156, the deductive database query is augmented. Additional details concerning these and other operations are provided herein.

FIG. 2 is a simplified functional block diagram of an embodiment of a networked computer system 200 in which embodiments of the question answering system described herein may be implemented. The networked computer system 200 is shown and described in the context of web-based applications configured on client and server apparatus coupled to a common Internet connection. The described system 200 is used only as an example of one such system into which embodiments disclosed herein may be implemented. The various embodiments disclosed herein can also be implemented in other systems that do not require networked configurations.

The networked computer system 200 can include at least one client 210A coupled to a network gateway 212 and/or at least one client 210N coupled to network 214. In one embodiment, the network gateway 212 can be an Internet Service Provider (ISP) server coupled to a network 214 such as the Internet. The client 210A can communicate with the network gateway 212 and destination devices coupled to the network 214 using one or more predetermined communication protocols. The communication protocol can be determined, for example, by an application running on the client 210A. In one embodiment, the application can be a web browser and the communication protocol can be TCP/IP.

A web server 216 can be coupled to the network 214. The web server 216 can be configured to provide a web interface to the question answering system, accessible by clients through network 214.

A natural language question compiler server 218 can be coupled to the web server 216. The natural language question compiler server 218 can process natural language queries and return deductive database queries. The natural language query compiler server 218 can process natural language queries coming from clients 210A-210N through the web server 216. In another embodiment, the natural language question compiler server 218 can be configured to directly process natural language questions coming from other clients, like, for example, a source that is coupled to the network 214.

A deductive database server 220 can be configured to facilitate the storage and retrieval of data stored in the data server 222. The deductive database server 220 can convert deductive database queries to database queries that can be executed in the data server 222. The deductive database server 220 can be one or more servers or applications distinct from the web server 216 or at least partially common with the web server 216.

The data server 222 can use a relational database management system (RDBMS) to perform its data storage and retrieval functions. The deductive database server 220 can connect to the data server 222 using SQL or any other database query language.

The data server 222 can be configured as one or more servers or applications that are distinct or at least partially common with the deductive database server 220. The data server 222 can include data or information that is retrieved via the deductive database server 220. In another embodiment, the data server 222 can be configured to directly store and retrieve data that is available, for example, from a source that is coupled to the network 214.

For example, the data server 222 can be configured to store data that is sourced from separate server 224 such as a third-party server that is separately coupled to the network 214.

In one embodiment, the data server 222 or deductive database server 220 can include a crawler, spider, robot, or similar application that is configured to discover and retrieve relevant data from sources coupled to the network 214. The robot can store the retrieved information to the data server 222. Additionally, or alternatively, the separate server 224 can be configured to provide data to the deductive database server 220 or the data server 222 for storage in the data server 222.

Other network sources can similarly provide information that can be stored in the data server 222. For example, a web client 210A-210N can submit a document, such as a product review, to a web server 216 for storage on a data server 222.

A user at a web client 210A-210N can access the information stored in the data server 222 by accessing the web server 216. For example, a user at the web client 210A-210N can access the information at the data server 222 using one or more applications running on the web client 210A-210N. The application can be, for example, a browser application.

The user can use the application running on the web client 210A-210N to input a natural language question to the web server 216. The web server 216 can include a question answering system that operates on the question to return one or more result sets that comprise the answer for the given question.

For example, the web client 210A-210N can receive a question from a user and can submit the question to the web server 216. The web server 216 can process the question using the question answering system included in the web server 216.

When the natural language question is received by the web server 216, a deductive database query representing the natural language query is generated as is further discussed herein.

The web client 210A-210N can include a desktop personal computer, workstation, laptop, personal digital assistant (PDA), cell phone, or any WAP-enabled device or any other computing device capable of interfacing directly or indirectly to the network 214. The web client 210A-210N typically runs a network interface application, which can be, for example, a browsing program such as Microsoft's Internet Explorer™ browser, Netscape Navigator™ browser, Mozilla™ browser, Opera™ browser, Firefox™ browser, or a WAP-enabled browser in the case of a cell phone, PDA or other wireless device, or the like. The network interface application can allow a user of the web client 210A-210N to access, process and view information and documents available to it from servers in the system.

The web client 210A-210N also typically includes one or more user interface devices, such as a keyboard, a mouse, touch screen, pen or the like, for interacting with a graphical user interface (GUI) provided by the browser on a display (e.g., monitor screen, LCD display, etc.), in conjunction with pages, forms and other information provided by servers. Although the system is described in conjunction with the Internet, it should be understood that other networks can be used instead of or in addition to the Internet, such as an intranet, an extranet, a virtual private network (VPN), a non-TCP/IP based network, any LAN or WAN or the like.

According to one embodiment, the web client 210A-210N and all of its components are operator configurable using an application including computer code run using a central processing unit such as an Intel Pentium™ processor, AMD Athlon™ processor, or the like, or multiple processors. Computer code for operating and configuring client system 210A-210N to communicate, process and display data and media content as described herein is preferably downloaded and stored on a processor readable storage medium, such as a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of the servers over the Internet, or transmitted over any other network connection (e.g., extranet, VPN, LAN, or other conventional networks) using any communication medium and protocols (e.g., TCP/IP, HTTP, HTTPS, FTP, Ethernet, or other media and protocols).

It should be appreciated that computer code for implementing aspects of the present disclosure can be C, C++, HTML, XML, Java, JavaScript, etc. code, or any other suitable scripting language (e.g., VBScript), or any other suitable programming language that can be executed on a client or server or compiled to execute on a client or server.

FIG. 3 is a simplified block diagram of a storage device 300 that includes an application that can be accessed and executed by a processor in any of the servers or clients in computer system 200. The application can be a client side application operating on a client 210A-210N and stored in a storage device 300, which can be part of the client or external to the client. Alternatively, the application can be a server side application that is stored in a storage device 300 and running on a server such as the database server 220. Storage device 300 can also be one or more memory devices that can be accessed by a processor and can include application code 310 that can be configured to store one or more processor readable instructions. Application code 310 can also include an application logic 312, an I/O file function 314, and a library function 316, which are associated with the application. Storage device 300 can further include application variables 320 that can include one or more storage locations. One or more memory locations can be configured to store device data 330. The device data 330 can also include data that is sourced by an external source, such as a user or an external device. For example, the device data 330 can include a natural language search query input by a user, and/or a corresponding deductive database query, and/or the corpus of data that is searched by a search application in response to the deductive database query. Storage device 300 can also include a log file 340 having at least one storage location that is configured to store results of the application or inputs provided to the application. For example, the log file 340 can be configured to store a history of queries or can be configured to store a history of query results.

5. Final Remarks

Although specific embodiments of the invention have been described in the in the detailed description including sections, various modifications, alterations, alternative constructions, and equivalents are also encompassed within the scope of the invention. The described invention is not restricted to operation within certain specific embodiments, but is free to operate within other embodiments configurations as it should be apparent to those skilled in the art that the scope of the present invention is not limited to the described series of transactions and steps.

The specification, including sections, and drawings are, accordingly, to be regarded in an illustrative rather than a restrictive sense. It will be evident, however, that additions, subtractions, deletions, and other modifications and changes may be made thereunto without departing from the broader spirit and scope of the invention as set forth in the claims.

What is claimed is:

1. A computer-implemented method comprising the steps of:
   (a) receiving a natural language question, regarding flights or hotels, as an input;
   (b) mapping the natural language question, regarding flights or hotels, into a deductive database query logical language representation of that natural language question regarding flights or hotels that captures one or more intents behind the natural language question regarding flights or hotels;
   (c) translating the deductive database query logical language representation into an SQL (Structured Query Language) query using one or more ontologies;
   (d) computing one or more result sets of the SQL query over a fact database; and
   (e) storing and providing one or more result sets of the deductive database query logical language representation, regarding flights or hotels;
   wherein mapping the natural language question into a deductive database query logical language representation of that natural language question that captures one or more intents behind the natural language question further comprises:
   performing a semantic parsing of the natural language question by mapping the natural language question into one or more semantic hypergraphs that capture one or more meanings behind the natural language question; and performing an intent detection of one or more semantic hypergraphs by transforming one or more semantic hypergraphs into a deductive database query logical language representation of that natural language question that capture the one or more intents behind the natural language question; and wherein performing a semantic parsing of the natural language question by mapping the natural language question into one or more semantic hypergraphs that capture one or more meanings behind the natural language question further comprises:

tokenizing the natural language question by breaking down the natural language question into a list of tokens; detecting named entities;

assigning syntactic and/or semantic metadata to the tokens;

creating temporary hypergraphs having as many disconnected subhypergraphs as token there are in the tokenized question used in the creating, that will be used to hold all the intermediate transformations that are required to generate the semantic hypergraphs;

performing syntactic joining by combining tokens using syntactic information associated to them;

performing semantic joining by combining tokens using semantic information associated to them;

performing semantic scope resolution by applying the right semantic scope for operations, whose syntactic and semantic scope usually diverge; and extracting the semantic hypergraphs from the temporary hypergraphs.

2. The method of claim 1 wherein the one or more semantic hypergraphs are represented in an ontology language.

3. The method of claim 1 wherein performing an intent detection of one or more semantic hypergraphs by transforming one or more semantic hypergraphs into a deductive database query logical language representation of that natural language question that captures the one or more intents behind the natural language question further comprises:

replacing zero or more individuals of the semantic hypergraph with variables;
detecting the answer variables;
building a deductive database query using the semantic hypergraph and the answer variables; and
augmenting the deductive database query.

4. A method according to claim 1, wherein computing one or more result sets of the deductive database query logical language representation comprises computing one or more result sets using one or more tourism domain ontologies stored in the deductive database.

5. A method according to claim 4, wherein the one or more tourism domain ontologies comprise at least one out of an ontology describing types of accommodation and an ontology describing modes of transportation.

6. A computer-based system comprising:
a natural language question compiler configured to:
receive a natural language question, regarding flights or hotels, as an input; and
map the natural language question, regarding flights or hotels, into a deductive database query logical language representation of that natural language question regarding flights or hotels that captures one or more intents behind the natural language question regarding flights or hotels;

a deductive database configured to:
receive the mapped deductive database query logical language representation as input;
translate the deductive database query logical language representation into an SQL (Structured Query Language) query using one or more ontologies;
compute one or more result sets of the SQL query over a fact database; and
store and provide one or more result sets of the deductive database query logical language representation, regarding flights or wherein the natural language question compiler comprises:
a semantic parser configured to:
receive a natural language question as an input; and
perform a semantic parsing of the natural language question by mapping the natural language question into one or more semantic hypergraphs that capture one or more meanings behind the natural language question;
an intent detector configured to:
receive one or more semantic hypergraphs as input; and
perform an intent detection of the one or more semantic hypergraphs by transforming the one or more semantic hypergraphs into a deductive database query logical language representation of that natural language question that capture the one or more intents behind the natural language question; and
wherein the semantic parser is configured to:
tokenize the natural language question by breaking down the natural language question into a list of tokens;
detect named entities;
assign syntactic and/or semantic metadata to the tokens;
create temporary hypergraphs having as many disconnected subhypergraphs as tokens there are in the tokenized question used in the creating, that will be used to hold all the intermediate transformations that are required to generate the semantic hypergraphs;
perform syntactic joining by combining tokens using syntactic information associated to them;
perform semantic joining by combining tokens using semantic information associated to them;
perform semantic scope resolution by applying the right semantic scope for operations, whose syntactic and semantic scope usually diverge; and
extract the semantic hypergraphs from the temporary hypergraphs.

7. The system of claim 6 wherein the one or more semantic hypergraphs are represented in an ontology language.

8. The system of claim 6 wherein the intent detector is further configured to:
replace zero or more individuals of the semantic hypergraph with variables;
detect the answer variables;
build a deductive database query using the semantic hypergraph and the answer variables; and
augment the deductive database query.

9. A system according to claim 6 wherein the deductive database is configured to compute the one or more result sets using the deductive database query logical language representation and one or more tourism domain ontologies stored in the deductive database.

10. A system according to claim 9, wherein the one or more tourism domain ontologies comprise at least one out of an ontology describing types of accommodation and an ontology describing modes of transportation.

11. A computer-implemented method comprising the steps of:
- (a) receiving a natural language question, as an input;
- (b) mapping the natural language question into a deductive database query logical language representation of that natural language question that captures one or more intents behind the natural language question;
- (c) translating the deductive database query logical language representation into an SQL (Structured Query Language) query using one or more ontologies;
- (d) computing one or more result sets of the SQL query over a fact database; and
  - (e) storing and providing one or more result sets of the deductive database query logical language representation, wherein mapping the natural language question into a deductive database query logical language representation of that natural language question that captures one or more intents behind the natural language question further comprises:

performing a semantic parsing of the natural language question by mapping the natural language question into one or more semantic hypergraphs that capture one or more meanings behind the natural language question; and performing an intent detection of one or more semantic hypergraphs by transforming one or more semantic hypergraphs into a deductive database query logical language representation of that natural language question that capture the one or more intents behind the natural language question, and wherein performing a semantic parsing of the natural language question by mapping the natural language question into one or more semantic hypergraphs that capture one or more meanings behind the natural language question further comprises:

tokenizing the natural language question by breaking down the natural language question into a list of tokens;

detecting named entities;

assigning syntactic and/or semantic metadata to the tokens;

creating temporary hypergraphs having as many disconnected subhypergraphs as token there are in the tokenized question used in the creating, that will be used to hold all the intermediate transformations that are required to generate the semantic hypergraphs;

performing syntactic joining by combining tokens using syntactic information associated to them;

performing semantic joining by combining tokens using semantic information associated to them;

performing semantic scope resolution by applying the right semantic scope for operations, whose syntactic and semantic scope usually diverge; and extracting the semantic hypergraphs from the temporary hypergraphs.

12. The method of claim 11 wherein the one or more semantic hypergraphs are represented in an ontology language.

13. The method of claim 11 wherein performing an intent detection of one or more semantic hypergraphs by transforming one or more semantic hypergraphs into a deductive database query logical language representation of that natural language question that captures the one or more intents behind the natural language question further comprises:

replacing zero or more individuals of the semantic hypergraph with variables;

detecting the answer variables;

building a deductive database queries using the semantic hypergraph and the answer variables; and augmenting the deductive database query.

* * * * *